United States Patent
Sampath et al.

(10) Patent No.: US 9,975,093 B2
(45) Date of Patent: May 22, 2018

(54) EXHAUST GAS FLOW MIXER

(71) Applicant: Tenneco Automotive Operating Company Inc., Lake Forest, IL (US)

(72) Inventors: Manoj K. Sampath, Ann Arbor, MI (US); Rangan Chakravarthi, Izumisano (JP); James Dougherty, Ypsilanti, MI (US)

(73) Assignee: Tenneco Automotive Operation Company Inc., Lake Forest, IL (US)

( * ) Notice: Subject to any disclaimer, the term of this patent is extended or adjusted under 35 U.S.C. 154(b) by 497 days.

(21) Appl. No.: 14/799,081

(22) Filed: Jul. 14, 2015

(65) Prior Publication Data

US 2015/0314250 A1    Nov. 5, 2015

Related U.S. Application Data

(63) Continuation of application No. 14/089,822, filed on Nov. 26, 2013, now Pat. No. 9,095,827, which is a
(Continued)

(30) Foreign Application Priority Data

Apr. 21, 2008    (DE) .................. 10 2008 020 008

(51) Int. Cl.
*B01F 5/04*    (2006.01)
*B01F 3/04*    (2006.01)
(Continued)

(52) U.S. Cl.
CPC ............ *B01F 5/0415* (2013.01); *B01D 53/79* (2013.01); *B01F 3/04007* (2013.01);
(Continued)

(58) Field of Classification Search
CPC ....... B01F 3/04; B01F 3/04049; B01F 5/0616
See application file for complete search history.

(56) References Cited

U.S. PATENT DOCUMENTS 3,880,597 A    4/1975    Goldschmidt et al.
4,692,030 A    9/1987    Tauscher et al.
(Continued)

FOREIGN PATENT DOCUMENTS

DE    4203807 A1    8/1993
DE    4313393 A1    10/1994
(Continued)

OTHER PUBLICATIONS

David K. Irick and Ke Nguyen Annual Technical Progress Report entitled "Energy Efficient Thermal Management for Natural Gas Engine Aftertreatment via Active Flow Control", 59 pages, dated Apr. 2004, Knoxville, TN.
(Continued)

*Primary Examiner* — Alison L Hindenlang
(74) *Attorney, Agent, or Firm* — Harness, Dickey & Pierce, P.L.C.

(57) ABSTRACT

A mixer for mixing an exhaust flow in an exhaust pipe includes a tubular housing having a first end, a second end and a center portion positioned between the ends. The center portion has a reduced size in relation to at least one of the first and second ends. The housing includes circumferentially spaced apart apertures extending through the center portion. A mixing element includes a body having a first peripheral portion and a second peripheral portion. The first peripheral portion is fixed to the center portion at a location adjacent to one of the apertures. The second peripheral portion is fixed to the center portion at a location adjacent to another one of the apertures.

24 Claims, 15 Drawing Sheets

Related U.S. Application Data continuation-in-part of application No. 13/571,542, filed on Aug. 10, 2012, now Pat. No. 8,939,638, which is a continuation-in-part of application No. 12/386,627, filed on Apr. 21, 2009, now Pat. No. 8,272,777.

(51) Int. Cl.
  *B01D 53/79* (2006.01)
  *F01N 3/08* (2006.01)
  *B01F 5/06* (2006.01)
  *F01N 3/20* (2006.01)
  *F01N 3/28* (2006.01)

(52) U.S. Cl.
  CPC ...... *B01F 3/04021* (2013.01); *B01F 3/04049* (2013.01); *B01F 5/0473* (2013.01); *B01F 5/0616* (2013.01); *B01F 5/0643* (2013.01); *F01N 3/08* (2013.01); *F01N 3/2066* (2013.01); *F01N 3/2892* (2013.01); *B01F 2005/0639* (2013.01); *Y02T 10/24* (2013.01)

(56) References Cited

U.S. PATENT DOCUMENTS

| | | | |
|---|---|---|---|
| 4,929,088 A | 5/1990 | Smith | |
| 5,489,153 A | 2/1996 | Berner et al. | |
| 6,086,241 A | 7/2000 | Herr et al. | |
| RE36,969 E | 11/2000 | Streiff et al. | |
| 6,258,144 B1 | 7/2001 | Huang | |
| 6,536,420 B1 | 3/2003 | Cheng | |
| 6,550,446 B1 | 4/2003 | Robley, Jr. | |
| 6,840,212 B2 | 1/2005 | Kim | |
| 6,932,049 B2 | 8/2005 | Kim | |
| 7,028,663 B1 | 4/2006 | Kim | |
| 7,267,098 B1 | 9/2007 | Tasanont | |
| 7,975,472 B2 | 7/2011 | Halbei et al. | |
| 8,082,732 B2 | 12/2011 | Nefischer | |
| 9,217,353 B2 | 12/2015 | Naga et al. | |
| 2006/0016176 A1 | 1/2006 | Hilden et al. | |
| 2007/0204751 A1 | 9/2007 | Wirth et al. | |
| 2007/0245718 A1 | 10/2007 | Cheng et al. | |
| 2008/0066448 A1 | 3/2008 | Halbei et al. | |
| 2008/0295497 A1 | 12/2008 | Kornherr et al. | |
| 2008/0308955 A1 | 12/2008 | Beckmann et al. | |
| 2009/0262599 A1 | 10/2009 | Kohrs et al. | |
| 2009/0320453 A1 | 12/2009 | Salanta et al. | |
| 2010/0218490 A1 | 9/2010 | Forster et al. | |
| 2010/0293931 A1 | 11/2010 | Peters et al. | |
| 2011/0036082 A1 | 2/2011 | Collinot | |
| 2011/0146254 A1 | 6/2011 | Yi et al. | |

FOREIGN PATENT DOCUMENTS

| | | |
|---|---|---|
| DE | 202006017848 U1 | 3/2007 |
| DE | 102005052064 A1 | 5/2007 |
| DE | 102005059971 A1 | 6/2007 |
| DE | 102006024778 B3 | 7/2007 |
| DE | 102006043225 A1 | 3/2008 |
| DE | 102007012790 A1 | 9/2008 |
| EP | 1712751 A2 | 10/2006 |
| EP | 2130605 A2 | 12/2009 |
| GB | 550188 A | 12/1942 |
| GB | 2321084 A | 7/1998 |
| JP | H10165769 A | 6/1998 |
| JP | 2005529273 A | 9/2005 |
| JP | 2008-274852 A | 11/2008 |
| WO | WO-97/35107 A1 | 9/1997 |
| WO | WO-03104624 A2 | 12/2003 |
| WO | WO-2008/034981 A1 | 3/2008 |
| WO | WO-2014109192 A1 | 7/2014 |

OTHER PUBLICATIONS

U.S. Appl. No. 14/089,822, filed Nov. 26, 2013, Sampath et al.
U.S. Appl. No. 14/325,460, filed Jul. 8, 2014, Palmer et al.

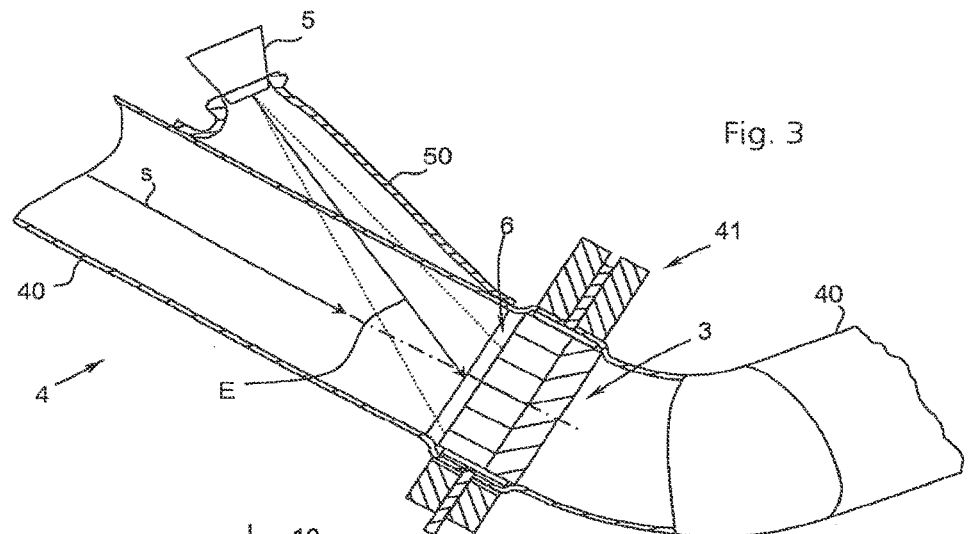
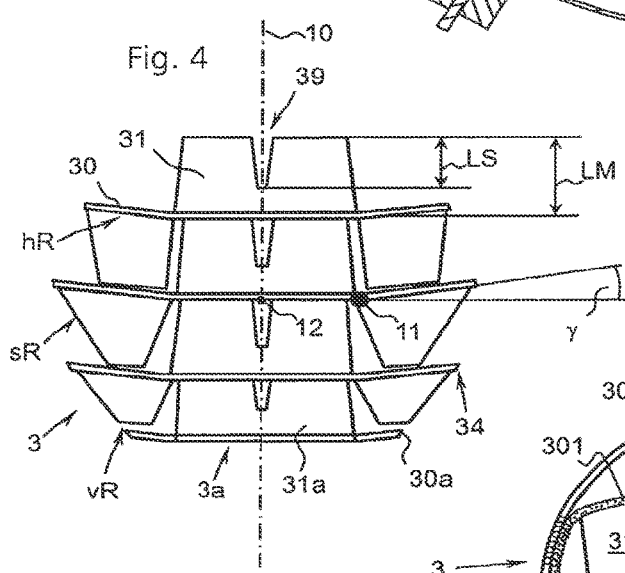
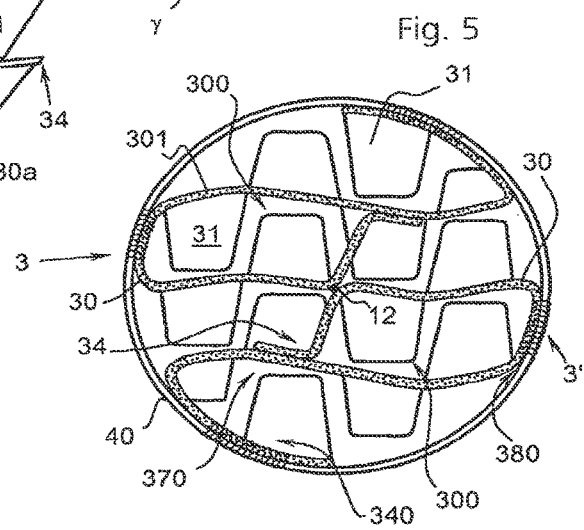

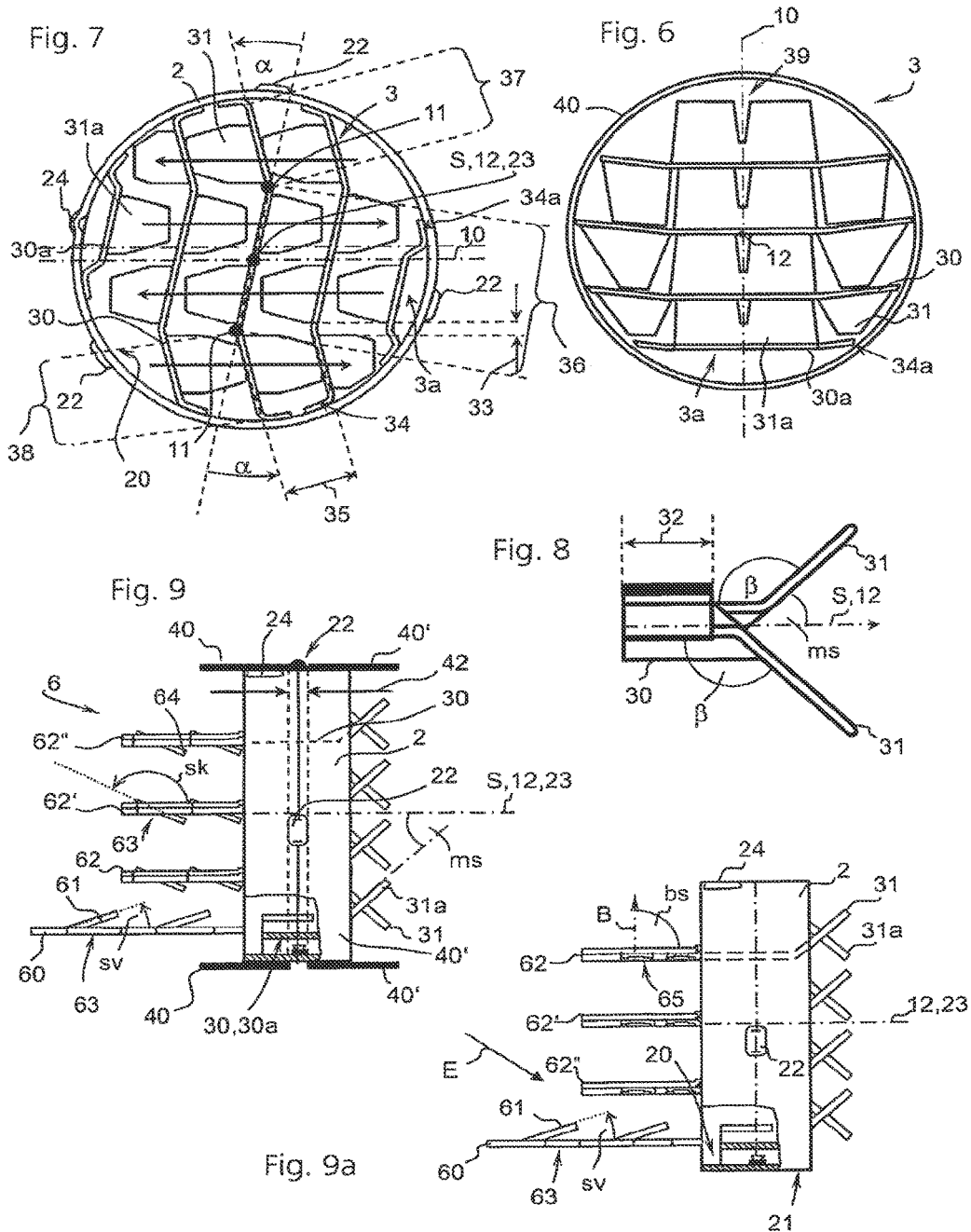

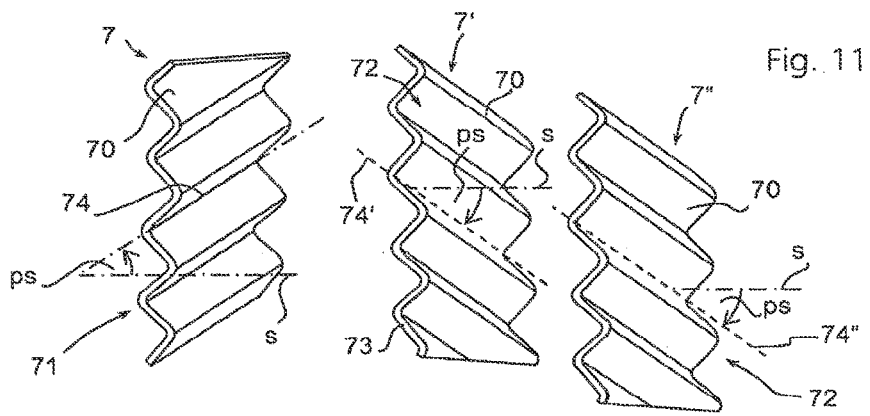
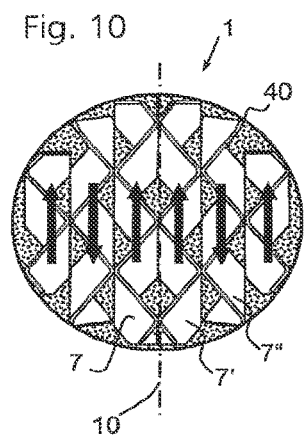
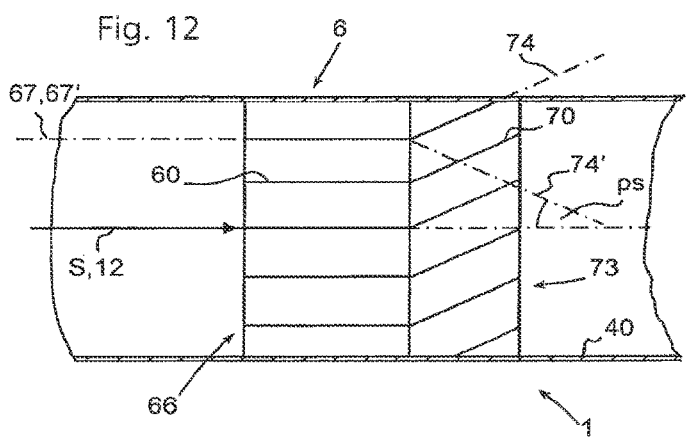
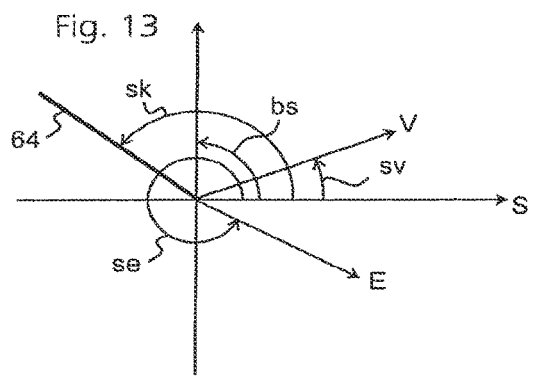
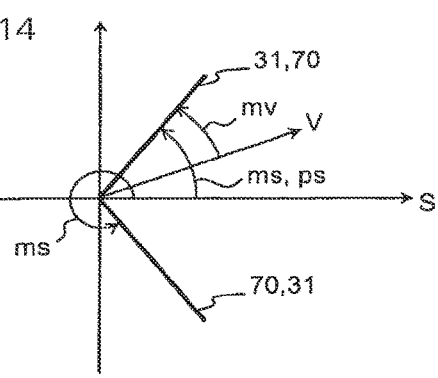

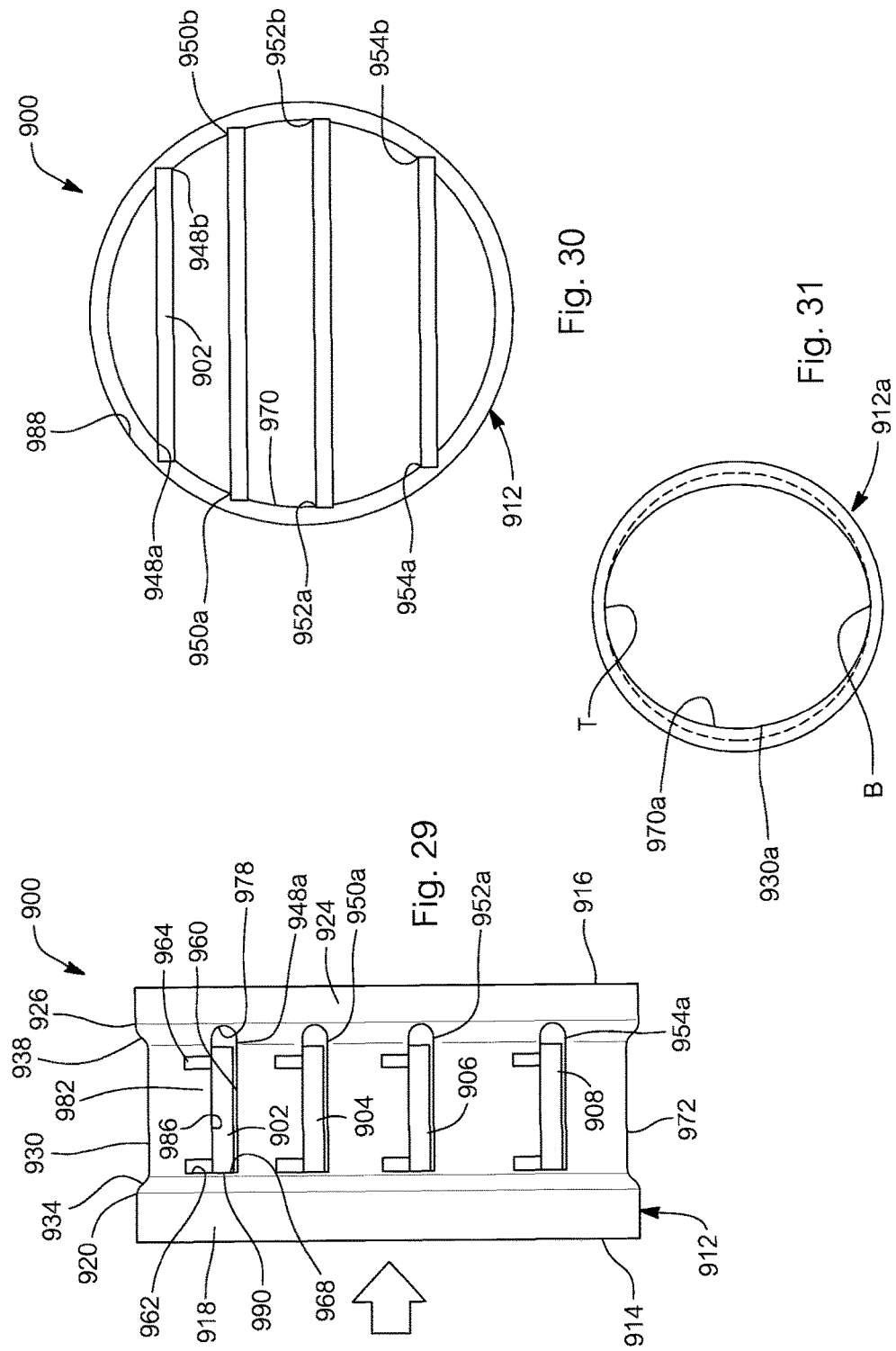

EXHAUST GAS FLOW MIXER

CROSS-REFERENCE TO RELATED APPLICATIONS

This application is a continuation of U.S. patent application Ser. No. 14/089,822, filed Nov. 26, 2013, which is a continuation-in-part of U.S. patent application Ser. No. 13/571,542, filed Aug. 10, 2012, now issued as U.S. Pat. No. 8,939,638 on Jan. 27, 2015, which is a continuation-in-part of U.S. patent application Ser. No. 12/386,627, filed on Apr. 21, 2009, now issued as U.S. Pat. No. 8,272,777 on Sep. 25, 2012, which application claims the benefit and priority of German application number DE102008020008.5, filed Apr. 21, 2008. The entire disclosures of each of the above applications are incorporated herein by reference.

BACKGROUND OF THE INVENTION

1. Field of the Invention

The invention relates to a method to use a mixer and to a mixer itself.

2. State of the Art

Several single-stage mixers are known from the most closely associated state of the art technology.

In DE 10 2006 024 778 B3, a mixer is described for which a wall structure for the flow guidance surfaces is provided, which essentially fills the profile of the housing, and thus causes a relatively high dynamic pressure loss. The wall structure is made of several layers of undulating strip material which is aligned parallel to the direction of flow. The individual layers respectively extend transverse to the direction of flow and are stacked on top of each other in an alignment which is transverse to the direction of flow. Here, the strip material in the individual layers is stacked on top of itself in such a manner that between the strip material of adjacent layers, a plurality of cells is formed which can respectively each be flowed through in the direction of flow.

Alongside the round undulation, it is also provided that the undulations of the strip material be designed with a rectangular or trapezoid form, as a result of which profiles for the individual cells can be achieved which are rectangular or hexagonal or with a honeycomb shape. The strip material forms a support onto which flow guidance surfaces are formed in pairs as mixing fins. For this purpose, the support comprises in alternation an area with a mixing fin and an area which is connected to it which has no mixing fins, so that one mixing fin extends into each cell.

In DE 20 2006 017 848 U1, a device for mixing exhaust gases is described with which a fin unit consisting of fins which are arranged directly following each other causes the exhaust gas to be mixed. The fin units are arranged transverse to the direction of flow adjacent to each other, and in the direction of flow one behind the other. The fins are connected to each other directly without a support, and are arranged in mirror symmetry in relation to a centre plane.

DE 10 2005 059 971 A1 describes a device for mixing a fluid with a large gas quantity flow which flows into a gas channel, in particular for the addition of a reduction agent into an exhaust gas which contains nitrogen oxide.

For this purpose, a nozzle lance with a nozzle for the delivery of the fluid is used, the axis of which forms an angle with the direction of flow of the gas quantity flow. The nozzle is assigned a flat mixer element with an interspace, which forms an angle with the direction of flow of the gas quantity flow. On the mixer element, flow eddies are formed, and at least a part of the fluid enters these flow eddies. In order to prevent the formation of a coating, it is provided that when a liquid is used as a fluid, the nozzle lance is equipped with at least two atomiser nozzles which are inclined against the direction of flow of the gas quantity flow and towards each other in the opposite direction. The atomiser nozzles are assigned to a disc-type mixer element so that a separation of evaporated gaseous parts and non-evaporated droplet parts is possible.

DE 10 2006 043 225 A1 describes an exhaust gas plant for a combustion machine with an exhaust gas line which guides the exhaust gas and an injection device for injecting a liquid into the exhaust gas line. Downstream from the injection device, an evaporation unit is provided in the exhaust gas line which comprises at least one tubular plate body which extends in a longitudinal direction of the exhaust gas line, and results in an improved evaporation of the injected liquid. Furthermore, a spring-type clamp device is provided which affixes the evaporation device in the exhaust gas line, or which tensions it against said exhaust gas line.

As the most closely associated state of the art technology, an exhaust gas system is described in DE 10 2005 052 064 A1 with an injection device for a reduction agent, in which downstream from the injection device, a plate body is arranged which comprises at least one wall which extends in the longitudinal direction of the exhaust gas line, and which is exposed to the exhaust gas flow on both sides. The reduction agent is sprayed at least partially onto the wall, resulting in a conversion of the liquid reduction agent into a vaporous or gaseous state.

SUMMARY OF THE INVENTION

The idea of the invention is to provide a method with which the degree of mixing of the exhaust gas and the fluid is increased, depending on the shape of the exhaust gas pipe.

The solution is a method for mixing an exhaust gas flow with a fluid in an exhaust gas pipe of an exhaust gas system, in which the fluid is injected into the exhaust gas pipe by means of an injection device, characterized by the following method stages:

a) the exhaust gas flow is guided in the area of the injection device in a direction of flow parallel to the exhaust gas pipe in the exhaust gas pipe, b) the fluid is injected in a central direction of injection which deviates from the direction of flow at an angle se, directly onto a deflection element which is arranged in the exhaust gas pipe, c) by means of at least one sheet metal part which is provided on the deflection element and which is raised with reference to the direction of flow at least partially at an angle sv, the exhaust gas flow is partially diverted with reference to the direction of flow from its direction of flow into a central direction of distribution, d) the fluid is carried along at least partially by the diverted part of the exhaust gas flow in the direction of distribution before and after impacting the deflection element, and is diverted by the raised sheet metal part into the direction of distribution. Here, it is essential that the exhaust gas flow is diverted by the sheet metal part before the mixer into the direction of distribution, which significantly deviates from the direction of flow. The angle se for the direction with which the fluid can be injected can here vary between 270° and 360°.

As a result, the fluid which is injected on one side is transported in the direction of the centre and over the entire profile of the exhaust gas pipe, and accordingly impacts the mixer over the entire profile of the mixer, and can then be mixed with the exhaust gas flow. Even when due to the installation space, the exhaust gas pipe is not straight but curved, it is advantageous when the direction of movement of the fluid can be influenced by the deflection element in relation to the progression of the exhaust gas pipe.

One further idea is that the fluid at least partially impacts a correction plate which is arranged with reference to the direction of injection before the sheet metal part, and at least partially undergoes a diversion into the direction of flow, and is then diverted into several mixing directions by a static mixer with at least one mixing element, and is thus mixed further. The correction plates are essentially arranged parallel to the sheet metal part above the sheet metal part, distributed on the side of the sheet metal part from which the fluid is injected. The distribution of the fluid before the mixer can be increased when further parts of the fluid flow are already diverted by the correction plate from the direction of injection into the direction of flow before they reach the sheet metal part.

Advantageous is that the raising of the sheet metal part is achieved by means of several fins which are provided on the sheet metal part, which are raised at the same or different angles sv, wherein the angle sv is between 0° and 85°. Due to the fact that the fins are raised, the sheet metal part can itself be arranged parallel to the direction of flow, so that only the fins ensure that the necessary diversion of the exhaust gas flow, and thus of the fluid, occurs.

Further advantageous is that the correction plate comprises several drill holes which run in a drill direction, wherein the drill direction runs with reference to the direction of flow at an angle bs of between 45° and 135°. As a result, a part of the fluid can be further distributed through one or more correction plates over the profile of the mixer. The fluid can thus partially flow further in the injection device and is partially diverted by the correction plates. The accumulated part of the flow is further diverted and carried along in the direction of flow, while the non-accumulated part of the flow which penetrates through the drill holes reaches the next correction plate in the direction of injection or the sheet metal part.

The correction plate is arranged parallel to the direction of flow and comprises several correction fins which are raised with reference to the direction of flow at an angle sk, wherein the angle sk is between 95° and 265°. The correction fins are stamped out of the correction plate, so that the fluid which is not accumulated can flow through the correction plate through the openings which are formed due to the stamping out. At the same time, the fluid is stabilised by the correction fins, so that in contrast to the flow conditions described above, it is diverted more slowly by the exhaust gas flow in the direction of flow.

Several mixing fins are provided on the mixing element which are raised with reference to the direction of flow at an angle ms and with reference to the direction of distribution at an angle mv, wherein the angle ms is a maximum of 70°, and the angle mv is greater than 1°. For the mixing process, it is advantageous that the fluid is further diverted by the mixing fins, and is not further guided in the same direction which is determined by the fin or the correction fin.

For this method a deflection element for arrangement in an exhaust gas pipe of an exhaust gas system is advantageous which guides an exhaust gas flow, and for retaining a fluid which is injected by means of an injection device into the exhaust gas system, wherein the deflection element can be positioned in the direction of flow before a static mixer with at least one mixing element and comprises at least one sheet metal part which can be positioned in the exhaust gas flow, wherein the sheet metal part is raised at least partially with reference to the direction of flow at an angle sv in a direction of distribution, as a result of which the exhaust gas flow is diverted with the fluid at least partially from the direction of flow into the direction of distribution. A fin which is raised at an angle sv is formed on the sheet metal part. The sheet metal part is arranged in the direction of flow directly before the mixer, in order to achieve a symmetrical distribution over the profile of the exhaust gas pipe and thus over the entire mixer profile of the fluid, which has in part already transformed into a gaseous state. The smaller the gaseous portion, the greater the effect of the deflection element on the mixing process by the mixer. The sheet metal part is at least partially raised by a fin in relation to the direction of flow at an angle sv in a direction of distribution, as a result of which the exhaust gas flow is diverted with the fluid at least partially from the direction of flow to the direction of distribution. The influence on the diversion of the sheet metal part itself, which is arranged parallel to the direction of flow, can be ignored.

On the sheet metal part, several fins are formed which are raised at the angle sv. With several fins, a diversion of the fluid which is distributed over the profile of the exhaust gas pipe is achieved. With several fins arranged one after the other in the direction of flow, the diversion of a flow element is greater, since the diversion in the direction of flow realised by the fins is partially accumulative.

The deflection element can be positioned in an exhaust gas pipe in such a manner that the fluid to a large extent impacts direction on the deflection element. As a result, the speed of the fluid is first reduced by the deflection element and the direction of flow can consequently be altered more easily.

Depending on the exhaust gas mass flow and the exhaust gas temperature, the penetration depth of the fluid in the exhaust gas pipe and the impact area of the fluid on the deflection element changes.

The deflection element comprises one or several correction panels which are arranged parallel to the direction of flow or parallel to the sheet metal part. The correction plates decelerate the fluid and enable an early diversion of the fluid by the exhaust gas flow. The correction plates can comprise differing lengths, or can be designed with equal lengths.

The correction plate comprises one or several correction fins which are raised at an angle sk between 95° and 265° and several openings which are formed transverse to the direction of flow by the correction fins, and/or several drill holes which run in a drill direction, wherein the drill direction runs at an angle bs between 45° and 135° with reference to the direction of flow. Alternatively, several drill holes are provided which run in a drill direction, wherein the drill direction runs at an angle bs between 45° and 135° in relation to the direction of flow. As a result, part of the fluid can flow directly in its direction of injection through an opening or a drill hole, and is not decelerated. A correction and stabilisation of the flow is achieved by the correction plates.

The sheet metal part protrudes with reference to the opposite direction of flow beyond all correction plates and the metal sheet part is arranged with reference to the central direction of injection behind the last correction plate. Due to the fact that the metal sheet part is thus arranged directly adjacent to the wall of the exhaust gas pipe which is opposite the injection point, the sheet metal part can influence the entire quantity of injected fluid.

The deflection element is designed in mirror symmetry with reference to a central plane which is oriented at right-angles to the direction of flow, or the fins and/or the correction fins are arranged in mirror symmetry with reference to the central plane. As a result of this symmetry, the central flow area in the exhaust gas pipe, in which the fluid is also injected, can be influenced to a significantly greater extent, since the central mixing elements or flow elements have the same alignment.

Advantageous is a multi-stage distributor consisting of a deflection element according to the description above and a static mixer which is affixed to the deflection element or which is arranged indirectly behind the deflection element with at least one mixing element, wherein the mixing element comprises at least one support for mixing fins or one flow element. Due to the combination of the deflection element with the mixer, a highly effective method for mixing is possible.

The metal sheet part or the correction plate is arranged on the support or on the flow element parallel or diagonal to the direction of flow. As a result, the mixer and the deflection element are designed at least partially, or also entirely, as a single piece, and are of identical material.

The mixing fins or the flow elements are raised with reference to the direction of flow at an angle ms of up to 70°, and with reference to the direction of distribution at an angle mv greater than 1°.

The mixing element is designed in mirror symmetry with reference to the central plane which is arranged at right-angles to the direction of flow, or the mixing fins and/or the supports are arranged in mirror symmetry with reference to the central plane.

Depending on the application, it could be advantageous that the mixing element is designed in point symmetry with reference to the direction of flow, or the mixing fins and/or the supports are arranged in point symmetry with reference to the direction of flow. Due to this arrangement, counter-rotating swirls are generated after the mixer in the exhaust gas pipe.

For assembly or retrofitting, it could be advantageous that in addition, a housing is provided which is parallel to the exhaust gas pipe and parallel to the direction of flow of the exhaust gas, on which the support or the flow elements are arranged, and the housing can be positioned on or in the exhaust gas pipe. As a result, the mixing elements or flow elements of the mixer can be pre-assembled in the housing before they are inserted into the exhaust gas pipe.

Advantageously the static mixer comprises several mixing elements for the exhaust gas which are arranged transverse to the direction of flow adjacent to each other, wherein each mixing element comprises several mixing fins and each mixing fin comprises one rear border area and two side border areas with reference to the direction of flow. Every mixing element comprises a support which is aligned parallel to the direction of flow, on which the mixing fins are arranged via their rear border area and are raised relative to the support. Every support comprises two end areas via which the respective support is affixed to the exhaust gas pipe. At least three mixing elements are provided, the supports of which are arranged adjacent to each other respectively in the area between the end areas transverse to the direction of flow, with a distance of at least 5 mm from each other. All mixing fins are arranged at a distance from the exhaust pipe with all side border areas and with the front border area. Preferably, the adjacent supports have a distance of between 5 mm and 100 mm, preferably between 12 mm and 15.5 mm. As a result, the mixing elements can be welded via the support on the exhaust gas pipe or on a separate housing, and the stability of the mixing element is retained by means of the supports and the mixing fins which are arranged on them, even during an increased exhaust gas flow and heat input. Due to the insulated mounting of each mixing element and due to the mixing fins which are arranged on the respective support at a distance from each other and facing the pipe wall, an improved circulation of the fins, and thus improved mixing, are achieved.

A static mixer or a distributor could also be advantageous, if the static mixer comprises several mixing elements which are arranged transverse to the direction of flow adjacent to each other, and the respective mixing element comprises a support which is aligned parallel to the direction of flow and several mixing fins which are arranged on the support and which are raised relative to the support. Each support comprises two end areas and two connecting areas which are arranged between the two end areas and which are arranged facing each other in the direction of the support and at a distance from the end areas. The end area and the first connecting area of the respective support are connected with each other, so that a partial area of the support forms a closed cell, and on the partial area of the support which surrounds the cell, at least two mixing fins are arranged on the support. As a result, the respective cell is not closed by a partial area of a support on which no mixing fin is provided, and is positioned in front of the mixing fin which extends into the cell.

For a static mixer or a distributor could also be advantageous, that the mixer comprises several flow elements for the exhaust gas which are arranged transverse to the direction of flow adjacent to each other. The respective flow element is formed from a sheet metal plate with an undulating cross-section profile which comprises several channels which run in the direction of parallel profile axes adjacent to each other. The profile axis of the respective flow element is oriented with reference to the direction of flow at an angle ms of up to 70° or at an angle ms of up to −70°. The profile axes are aligned by at least two flow elements which are arranged adjacent to each other in an angle ms which is equal in terms of direction and size. As a result, a flow of fluid which reaches the centre of the mixer, which flows in a direction transverse to the direction of flow, is essentially captured by the two central flow elements which have the same alignment, and can be diverted in another direction. The cross-section profile is preferably regularly undulating, and the profile axes all arranged in parallel.

A mixer for mixing an exhaust flow with a fluid injected into an exhaust pipe includes a tubular housing having a reduced size center portion positioned between first and second ends. The housing includes circumferentially spaced apart apertures extending through the center portion. A first mixing element includes a first peripheral portion positioned within one of the apertures and a second peripheral portion positioned within another one of the apertures. A second mixing element includes third and fourth peripheral portions positioned within other apertures of the housing.

A mixer for mixing an exhaust flow of the fluid injected into an exhaust pipe includes a tubular housing having a leading collar portion positioned at one open end of the housing and a trailing collar portion positioned at an opposite open end of the housing. A center portion includes a reduced outer size and reduced inner size as compared to the leading and trailing collar portions. A mixing element is positioned within the housing and extends into two apertures extending through the center portion. The mixing element is fixed to the center portion of the housing at locations adjacent to each of the two apertures.

Further advantages and details of the invention are explained in the patent claims and in the description, and shown in the figures.

BRIEF DESCRIPTION OF THE DRAWINGS

FIG. 3 shows a view according to FIG. 1 with a mixer and a deflection element which is designed in a similar manner to a mixer;

FIG. 4 shows a mirror symmetry mixer;

FIG. 5 shows a point symmetric mixer with a mixing element with a cell;

FIG. 6 shows a mixer according to FIG. 4 in an exhaust gas pipe;

FIG. 7 shows a point symmetric mixer with supports which are at a distance;

FIG. 8 shows a side view of a support with mixing fins which are raised in alternation;

FIG. 9 shows a side view of a mixer according to FIG. 7 with a deflection element with correction fins;

FIG. 9a shows a side view of a mixer according to FIG. 7 with a deflection element with drill holes;

FIG. 10 shows a view of a mixer with flow elements which lie in contact with each other;

FIG. 11 shows three flow elements for a mixer according to FIG. 10 which are arranged differently in relation to their respective profile axis;

FIG. 12 shows a side view of a mixer according to FIG. 10 in an exhaust pipe with a pre-activated deflection element;

FIG. 13 shows an angle diagram for the deflection element and the injection device;

FIG. 14 shows an angle diagram for the mixing fin in relation to the deflection element;

FIG. 29 is a side view of another alternate mixer;

FIG. 30 is an end view of the alternate mixer depicted in FIG. 29; and

FIG. 31 is a cross-sectional view of a housing of another alternate mixer.

DETAILED DESCRIPTION OF THE PREFERRED EMBODIMENT

Figure 1:
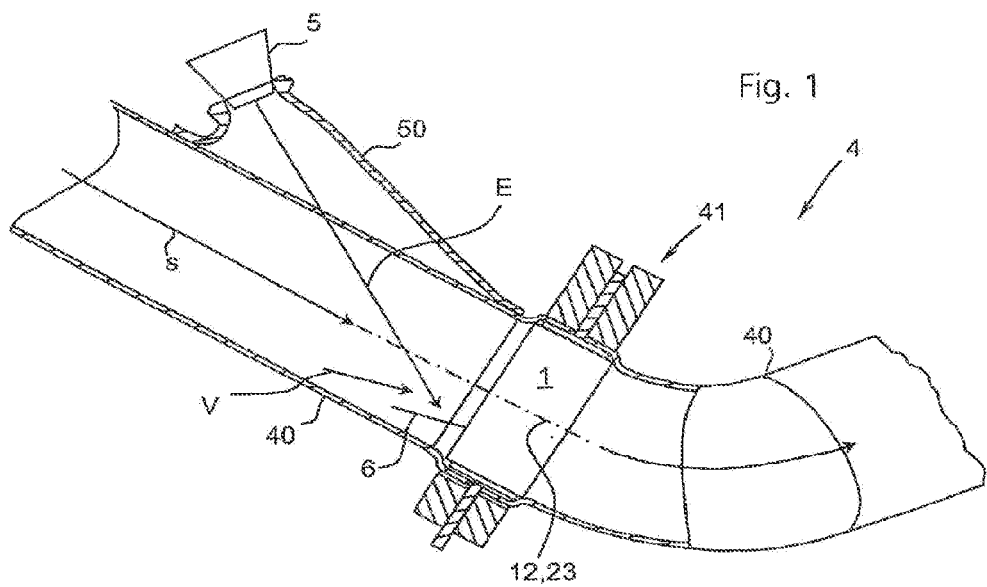
FIG. 1 shows a view of a part of an exhaust gas system with an exhaust gas pipe and an injection device, in which a mixer is arranged with a deflection element which is raised in relation to the direction of flow.

FIG. 1 shows an exhaust pipe 40 as part of an exhaust gas system 4, into which a fluid is injected in a direction of injection E as a reduction agent via a flange 50 which is arranged on the exhaust gas pipe 40 and an injection device 5 which is positioned on the flange 50. For reasons of clarity, the figures show the central direction of injection E and not the real, conical flow conditions which are indicated in FIG. 3 by the two dotted lines which form a v shape.

In the exhaust gas pipe 40, an exhaust gas essentially flows in parallel to the exhaust gas pipe 40 in a direction of flow S. For the description of the invention, it is assumed for purposes of simplicity that the direction of flow S runs parallel before a deflection element 6 over the entire pipe cross-section of the exhaust gas pipe 40.

Depending on the mass flow of the reduction agent, the reduction agent flows in the direction of injection E and into the exhaust gas pipe 40, to a greater or lesser extent diverted by the exhaust gas flow. After the injection device 5, a distributor, consisting of a mixer 1 with a deflection element 6, is provided in the direction of flow S. The distributor is positioned in the exhaust gas pipe 40 via the mixer 1 and a flange connection 41.

The reduction agent to a large extent impacts the deflection element 6, so that the flow impulse of the reduction agent is reduced. The deflection element 6 is raised at an angle sv relative to the direction of flow S, so that the exhaust gas flow is diverted via the deflection element 6 from the direction of flow S into a direction of distribution V. Due to this diverted exhaust gas flow, the reduction agent is swept along in the direction of distribution V partially before and above all after it impacts the deflection element 6, and is guided into the pipe centre of the exhaust gas pipe 40.

Figure 2:
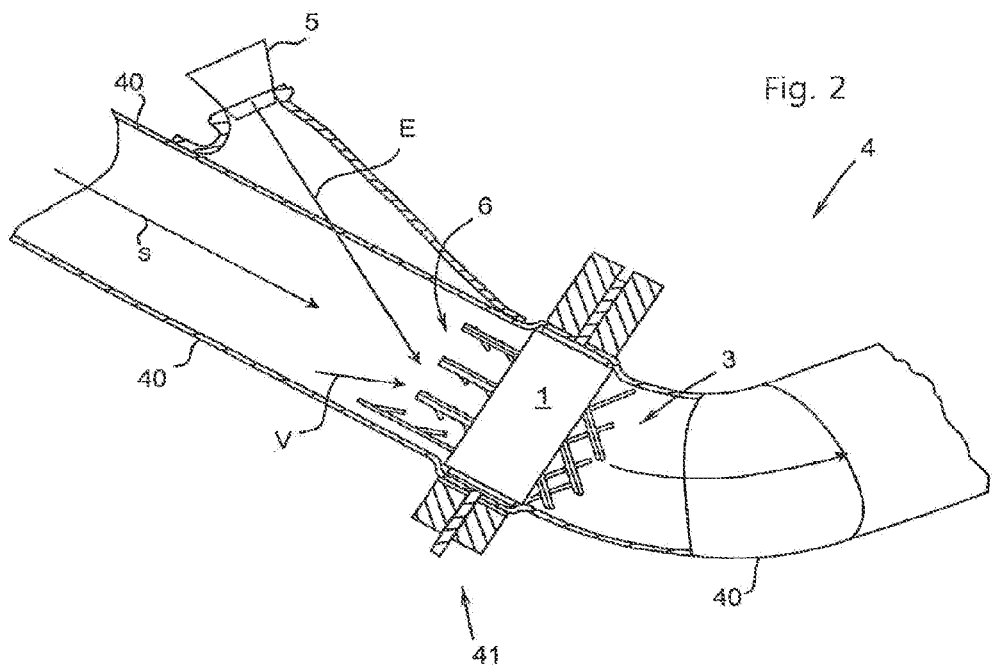
FIG. 2 shows a view according to FIG. 1 with a mixer and a deflection element with correction plates.
Figure 15:
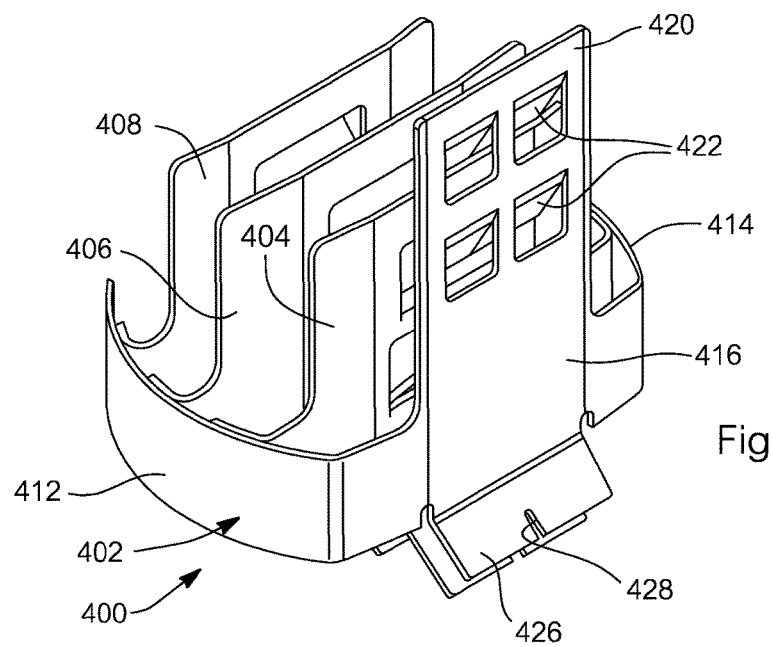
FIG. 15 is a perspective view of an alternate mixer.
Figure 16:
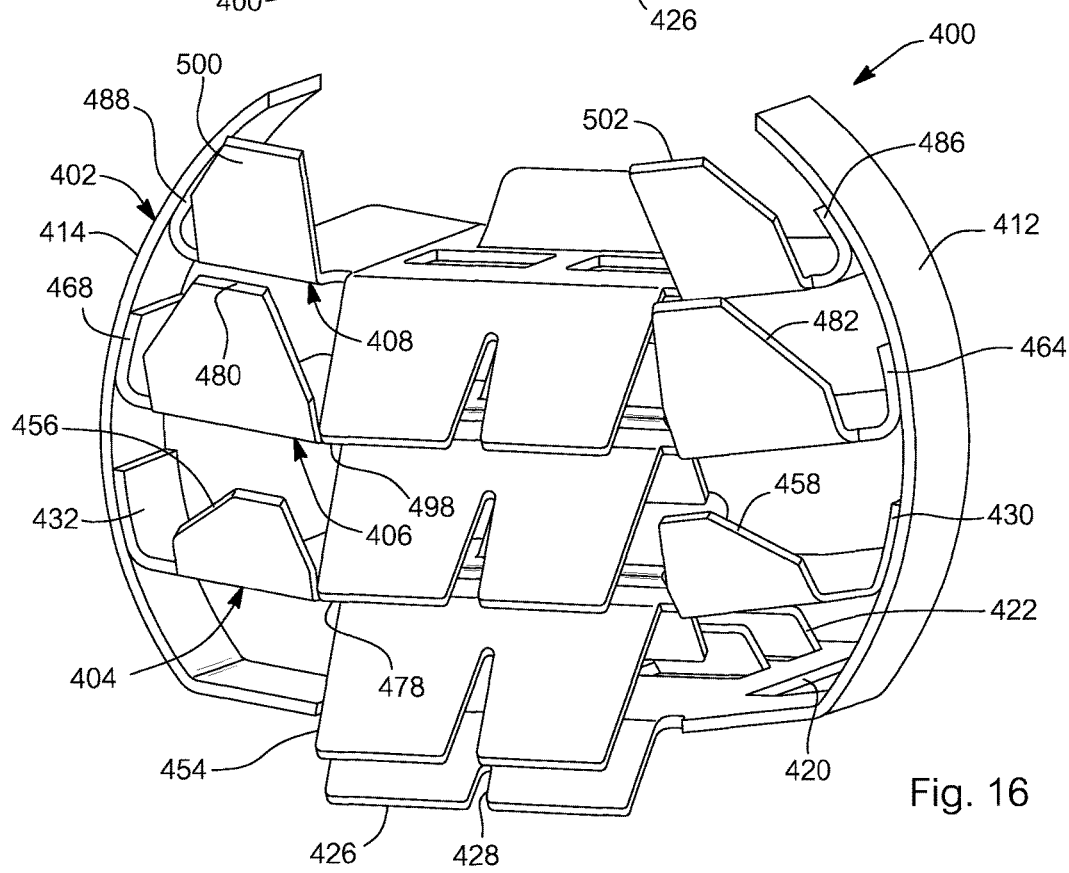
FIG. 16 is another perspective view of the alternate mixer.
Figure 17:
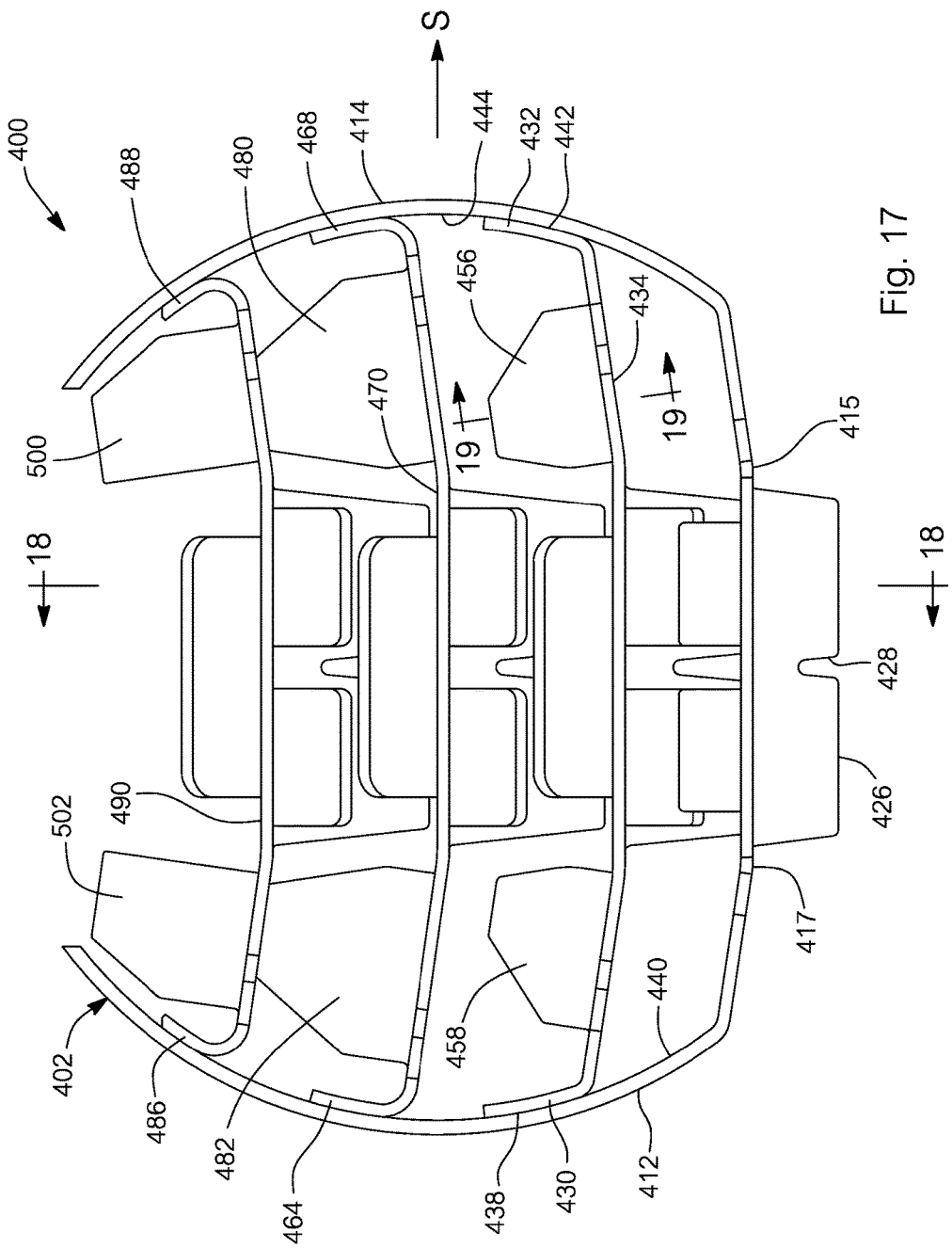
FIG. 17 is an end view of the alternate mixer.

FIG. 2 shows part of an exhaust gas system 4 as is described with reference to FIG. 1, although here, a mixer 1 with mixing fins 31 is integrated, as is generally shown in greater detail in FIGS. 4 to 7. The deflection element 6 for such mixers 1 with mixing fins 31 is shown in greater detail in FIG. 9, and comprises as part of the deflection element 6 a sheet metal part 60 which is arranged parallel to the direction of flow, with a fin 61 which is raised at the angle sv and further correction plates 62 with correction fins 64.

The mixers 1 according to FIGS. 4, 6 and 7 comprise three mixing elements 3 which are arranged transverse to the direction of flow S and adjacent to each other respectively, and one to two additional mixing elements 3a. The mixing element 3, 3a consists fundamentally of a support 30, 30a and one or several mixing fins 31, 31a which are arranged on it. The respective mixing fin 31, 31a is affixed to the support 30, 30a via its border area hR with reference to the direction of flow S. Side border areas sR and a front border area vR with reference to the direction of flow S form free flow edges and are neither connected to another mixing fin 31, 31a, nor to a housing 2 or an exhaust pipe 40.

The support 30 comprises on both its ends one end area 34 respectively, in which no mixing fin 31 is provided, and which is angled in accordance with FIG. 7. The support 30 is affixed via the two end areas 34 as shown as an example in FIG. 7 on a housing 2 or according to FIG. 6 on an exhaust gas pipe 40. Between the two end areas 34, the support 30 hangs freely in the housing 2 or in the exhaust gas pipe 40, i.e. it is neither supported or held by another construction element, nor does it support or hold another construction element. Furthermore, the supports 30 are essentially arranged parallel to each other in the areas between the end areas 34, and are at a distance 35 of approx. 13.5 mm from each other.

The housing 2 is a cylindrical pipe part, on the inner sheath surface 20 of which the mixing elements 3 and, depending on the exemplary embodiment, the additional mixing elements 3a, are affixed. A mixer 1 of this type is inserted with the housing 2 into an exhaust gas pipe 40 of an exhaust gas system 4, as is shown in FIG. 2, and exhaust gas flows through it in a direction of flow S which is parallel to a central axis 23 of the housing 2.

The support 30 consists of a strip-shaped sheet metal material with a width 32 defined in FIG. 8, and is aligned parallel to the direction of flow S. The direction of flow S refers to the main direction of flow of the exhaust gas within the mixer 1, and runs parallel to a central axis 12 of the mixer 1 and the central axis 23 of the housing 2. Due to the fact that the support 30 runs parallel to the direction of flow S, and thus parallel to the wall of the exhaust gas pipe 40, the mixer 1 can simply be mounted transverse to the direction of flow in the exhaust gas pipe 40.

In the exemplary embodiments according to FIG. 7, with three mixing elements 3 which are essentially arranged in parallel adjacent to each other and in point symmetry, each of the mixing elements 3 is formed by a support 30 and four mixing fins 31. The entire mixing element 3 thus consists of a support 30 and four mixing fins 31.

The support 30 can be divided between the end areas 34 into three partial areas 36 to 38. Outer partial areas 37, 38 respectively adjoin a central partial area 36 on the opposite side. Each of the outer partial areas 37, 38 is at an angle in relation to the central partial area 36, i.e. the central partial area 36 encompasses an angle α with each of the two outer partial areas 37, 38. With reference to a first axis 11 which runs parallel to the direction of flow S, the two outer partial areas 37, 38 thus cut through the central partial area 36 at an angle α of approx. 12°. The outer partial areas 37, 38 are angled conversely with reference to the central partial area 36, so that the support 30 is designed in point symmetry with reference to a central axis 12 which is parallel to the direction of flow S, i.e. the support 30 and the mixing fins 31 are formed and arranged point symmetrically to each other.

As well as the three mixing elements 3, two additional mixing elements 3a are also provided in the areas next to the mixing elements 3. The additional mixing element 3a is formed by a support 30a and a mixing fin 31a. The additional mixing element 3a is affixed via its two end areas 34a to the inner sheath surface 20 of the housing 2, and in a freely supporting manner between the two end areas 34a.

With the exemplary embodiment according to FIG. 4, the support 30 can be divided in accordance with the exemplary embodiment according to FIG. 7 into three partial areas 36 to 38. Outer partial areas 37, 38 respectively adjoin a central partial area 36 on the opposite side. Each of the outer partial areas 37, 38 at an angle in relation to the central partial area 36, i.e. the central partial area 36 encompasses an angle α with each of the two outer partial areas 37, 38. With reference to a first axis 11 which runs parallel to the direction of flow S, the two outer partial areas 37, 38 thus cut through the central partial area 36 at an angle γ of approx. 9°. The outer partial areas 37, 38 are angled in the same direction with reference to the central partial area 36, so that the support 30 is designed in mirror symmetry with reference to a central plane 10 which is parallel to the direction of flow S.

As a result of the point symmetry, the flow on one side of the central plane 10 is diverted upwards and outwards, converse to the flow on the other side of the central plane 10 in a direction transverse to the direction of flow S. The flow is represented by arrows in FIG. 7.

In the exemplary embodiments according to FIGS. 4 to 9a, the mixing fins 31 encompass an angle β with reference to the direction of the support 30 and an angle ms with reference to the direction of flow S. The mixing fins 31 are shown in alternation. As is shown in greater detail in FIGS. 8 and 9, the angle β is +135° or −135°, and the angle ms is +45° or −45°. Furthermore, mixing fins 31 which are directly adjacent partially comprise, as is shown in particular in FIG. 7, a regular distance 33 from each other of at least 1 mm.

In an exemplary embodiment not shown, the adjacent end areas 34 are connected with each other by two supports 30 which are arranged adjacent to each other. Additionally, one end area 34a respectively of the additional mixing elements 3a is connected with one end area 34 respectively of the adjacent mixing element 3. This is achieved by means of the fact that the three mixing elements 3 and the two additional mixing elements 3a are produced from a single sheet metal strip.

On an outer side 21 of the housing 2, a securing element 24 is provided, as shown in FIGS. 7 and 9. The securing element 24 is designed as a burl and protrudes opposite the outer side 21. Due to the securing element 24, the mixer 1 can be fastened against being turned around the central axis 23 in the exhaust gas pipe 40. Furthermore, the securing element 24 also serves the purpose when being fastened of simultaneously specifying the rotating position of the mixer 1 with reference to the central axis 23 in the exhaust gas system 4. For this purpose, a corresponding retainer which is not shown in greater detail is provided at a certain position, into which the securing element 24 is pushed in the direction of the central axis 23.

In accordance with FIG. 9, the mixer 1 is mounted with the housing 2 between two exhaust gas pipes 40, 40'. For this purpose, the two exhaust gas pipes 40, 40' are attached on both sides to the housing 2. In order to weld the two exhaust gas pipes 40, 40' and for the weld connection of the exhaust gas pipes 40, 40' with the mixer 1, a gap 42 is provided between the exhaust gas pipes 40, 40'. The gap 42 is created as a result of the fact that the exhaust gas pipes 40, 40' are distanced from each other in the direction of the central axis 12 by the circumference of distributed adjusting elements 22, onto which the respective exhaust gas pipe 40, 40' adjoins on one side respectively in the direction of the central axis 12.

The mixer 1 according to FIGS. 4 and 6 is designed in mirror symmetry to a central plane 10 which is oriented parallel to the direction of flow S, i.e. the support 30 and the mixing fins 31 are formed and arranged in mirror symmetry to each other. These mixers 1 comprise three mixing elements 3 which are arranged in parallel and adjacent to each other, wherein each of the mixing elements 3 is formed by a support 30 and one or three mixing fins 31 arranged on the support 30.

The support 30 can be divided between the end areas 34 into three partial areas 36 to 38. Outer partial areas 37, 38 respectively adjoin a central partial area 36 on the opposite side. Each of the outer partial areas 37, 38 at an angle in relation to the central partial area 36, i.e. the central partial area 36 encompasses an angle γ with each of the two outer partial areas 37, 38. With reference to a first axis 11 which runs parallel to the direction of flow S, the two outer partial areas 37, 38 thus cut through the central partial area 36 at an angle γ of approx. 9°. The outer partial areas 37, 38 are angled in the same direction with reference to the central partial area 36, so that the support 30 is designed in mirror symmetry with reference to a central axis 12 which is parallel to the direction of flow S.

The central mixing fin 31 comprises a slit 39 in its centre, the length LS of which is between 50% and 80% of a length LM of the mixing fin 31. Due to the slit 39, the formation of swirls is reduced, since the flow in the central area is diverted to a lesser extent. Furthermore, precisely in the central area of the mixer 1, in which the mass flow is greatest, the flow dynamic resistance of the mixer 1 is reduced.

As well as the three mixing elements 3, an additional mixing element 3a is provided below the three mixing elements 3. The additional mixing element 3a is formed by a support 30a and a mixing fin 31a, which also comprises a slit 39. The additional mixing element 3a is affixed via its two end areas 34a to the inner sheath surface 20 of the housing 2 and in a freely supporting manner between the two end areas 34a.

FIG. 5 shows a point symmetrical mixer 1 with two identical mixing elements 3, 3'. The respective mixing element 3, 3' respectively comprises two end areas 34, 340 and two connecting areas 370, 380 which are provided between the end areas 34, 340. The end area 34 and the first connecting area 370 of the respective support 30 are connected with each other, so that a partial area 301 of the support 30 forms a closed cell 300. On the partial area 301 of the support 30 which surrounds the cell 300, two mixing fins 31 are arranged on the support 30. The mixing element 3 is affixed to the exhaust gas pipe 40 via the end area 340 and the second connecting area 380.

The point symmetrical mixer 1 according to the exemplary embodiments in accordance with FIGS. 5 and 7 can equally be combined with a deflection element 6, as can the mirror symmetrical mixer 1 according to the exemplary embodiments in accordance with FIGS. 4 and 6. The deflection element 6 comprises, as is shown in FIGS. 9 and 9a, a sheet metal part 60 with one or several fins 61 which are raised at an angle sv of approx. 20°. Due to the fins 61, the exhaust gas flow is diverted upwards in a direction of distribution V and is thus the reduction agent is also swept upwards. The sheet metal part 60 is directly arranged on the support 30, 30a and in accordance with the exemplary embodiments shown forms with the mixing element 3, 3a a construction element which is a single piece and which is made of identical material.

The deflection element 6 comprises several correction plates 62, 62', 62" which are arranged parallel to the direction of flow S and parallel to the sheet metal part 60, which cause the reduction agent to be distributed directly before the mixer 1. The correction plate 62 is arranged directly on the support 30, 30a and in accordance with the exemplary embodiments shown forms with the mixing element 3, 3a a construction element which is a single piece and which is made of identical material.

The correction plates 62, 62', 62" comprise according to FIG. 9 several correction fins 64 which are raised with reference to the direction of flow S at an angle sk of 155°. The correction fins 64 are, as shown in detail in FIG. 14, partially stamped out of the correction plate 62 and protrude from the correction plate 62 in the direction of the adjacent correction plate 62 and/or in the direction of the sheet metal part 60. As a result, below the correction fin 64, an opening 63 is formed on the respective correction plate 62 which corresponds to the area of the correction fin 64 which protrudes from the correction plate 62. The correction fin 64 can protrude on one or both sides of the correction plate 62.

Equally, the fin 61 on the sheet metal part 60 is stamped out, so that the sheet metal part 60 comprises an opening 63 below the respective fin 61 which corresponds to the area of the fin 61 which protrudes from the sheet metal part 60. As is shown in FIG. 14, the correction fin 64 protrudes from the correction plate 62 on both sides and the fin 61 protrudes on one side from the sheet metal part 60.

The correction plates 62, 62', 62" according to FIG. 9a comprise several drill holes 65 instead of correction fins, which are oriented in a drill direction B which runs at an angle bs of 90° to the direction of flow S, through which the exhaust gas flow with the reduction agent can flow at least partially through the deflection element 6 in the direction of the central axis 12.

FIG. 3 also shows a part of an exhaust gas system 4 as described in FIGS. 1 and 2, however in this exemplary embodiment, a mixer 1 is combined with a deflection element 6 which is constructed in a similar manner to the mixer 1 itself. A mixer 1 of this type is formed in accordance with FIG. 10 from several flow elements 7, 7' which abut adjacent to each other.

FIG. 11 shows in detail that the mixer 1 is constructed of several flow elements 7, 7', 7" which abut adjacent to each other. The respective flow element 7, 7', 7" is formed of a sheet metal plate 70 with an undulating cross-section profile 71, which comprises a front side 73 and several channels 72 which run adjacent to each other in the direction of parallel profile axes 74. The profile axes 74, 74' of the two adjacent flow elements 7, 7' run alternately raised with reference to the direction of flow S at an angle ps of +40° and −40°. As a result, the flow is simultaneously diverted upwards and downwards in the channels formed by the two flow elements 7, 7'.

However, according to the invention, the profile axes 74', 74" of the two central flow elements 7', 7" which are adjacent with reference to the central plane 10 run parallel, i.e. at an angle ps of −40° which is the same in terms of its direction and size, and thus do not abut each other. As a result, as is clarified by the arrows in FIG. 10, the flow within the channels which are formed by the two flow elements 7', 7" is diverted only upwards, i.e. in the same direction. The angle ps corresponds to the angle ms in the exemplary embodiments described above.

Due to the same alignment of the profile axes 74', 74" of the two flow elements 7', 7" which are arranged opposite with reference to the central plane 10 and at the same time, adjacent to each other, a mirror symmetrical geometry of the mixer 1 is achieved with reference to the central plane 10. The part of the exhaust gas flow and reduction agent which flows in the centre of the mixer 1 is thus diverted in one direction within these two flow elements 7', 7".

FIG. 12 shows a cross-section of a mixer 1 in which the profile axes 74, 74' are raised at an angle of ±30°. Before the mixer 1, a deflection element 6 is arranged which is constructed in a similar manner to the mixer 1. With the deflection element 6, several sheet metal parts 60 with a cross-section profile 66 are also arranged directly adjacent to each other. Profile axes 67, 67' of the deflection element 6 of adjacent sheet metal parts 60 are not raised with reference to the direction of flow S, i.e. they run parallel to the direction of flow S. The deflection element 6 thus forms individual channels between the individual sheet metal parts 60 in correspondence with the two central flow elements 7', 7" of the mixer 1, in which the exhaust gas flow and the reduction agent are guided in only a direction which is parallel to the direction of flow S.

FIG. 13 shows an angle diagram which represents the angles and angle ratios described above for the correction fin 64 and the direction of injection E, together with the direction of distribution V and the direction of flow S. FIG. 14 shows such an overview with reference to the mixing fins 31 and the sheet metal plates 70, and to the direction of distribution V and the direction of flow S.

FIGS. 15-20 depict an alternate mixer identified at reference numeral 400. Mixer 400 includes a first mixing element 402, a second mixing element 404, a third mixing element 406 and a fourth mixing element 408. Each of the mixing elements 402, 404, 406, 408 are fixed to one another to provide mixer 400 as a one-piece assembly. First mixing element 402 functions as a holder or housing as well as a mixing element. To accomplish this function, first mixing element 402 includes a first arcuately shaped side wall 412 spaced apart from a second arcuately shaped side wall 414. A substantially planar base 416 interconnects first side wall 412 with second side wall 414 to define a "U" shape. Base 416 may be curved or include minor bends to provide bending inflection points 415, 417, as shown in the Figures. First side wall 412 includes a distal end 418 spaced apart from a distal end 419 of second side wall 414. Mixer 400 is positioned within exhaust gas pipe 40 such that the gap between ends 418, 419 is aligned with injection device 5. Reagent that may be flowing along an upper inner surface of pipe 40 will not be restricted by the presence of a mixer wall but will instead flow downstream between ends 418, 419.

An integrally formed deflection element 420 axially extends from base 416 substantially parallel to the direction of flow S. Deflection element 420 includes a plurality of correction fins 422 which are raised with reference to the direction of flow at an angle A of 30°. A mixing fin 426 extends at an angle B of 45° in relation to the direction of flow S. A slit 428 extends into mixing fin 426 to partially bifurcate the fin.

Second mixing element 404 includes a first flange 430 spaced apart from a second flange 432. A base 434 interconnects first flange 430 and second flange 432. Base 434 extends substantially parallel to and offset from base 416. First flange 430 includes an outer surface 438 positioned in engagement with an inner surface 440 of first side wall 412. First flange 430 is fixed to first side wall 412 using a process such as welding, riveting or some other mechanical fastening technique. In similar fashion, second flange 432 includes an outer surface 442 positioned in engagement with an inner surface 444 of second side wall 414.

Second flange 432 is fixed to second side wall 414. Second mixing element 404 also includes one or more correction fins 450 extending at an angle C of 40° relative to the direction of flow S. A mixing fin 452 extends in an opposition direction from correction fin 450 at an angle D of 40°. In the embodiment depicted in FIGS. 15 through 20, a single correction fin 450 is depicted as being upstream from two laterally spaced apart mixing fins 452. Another partially bifurcated mixing fin 454 extends parallel to fin 426. Outer mixing fins 456 and 458 extend at an angle E of 45° with reference to the direction of flow S. It should be appreciated that angle E need not equal angle B and that it is often times beneficial to have mixing fin 454 extend in a non-parallel manner relative to fin 426. These angles may be changed to "tune" mixer 400 within a particular system to best achieve a uniform reductant distribution.

Third mixing element 406 is substantially similar to second mixing element 404. Third mixing element 406 includes first and second flanges 464, 468. A base 470 interconnects first flange 464 with second flange 468. Base 470 is positioned to extend substantially parallel to the direction of flow S and base 434. First flange 464 and second flange 468 are shaped and positioned to be fixed to inner surfaces 440, 444 of first mixing element 402. In similar fashion to second mixing element 404, third mixing element 406 includes a correction fin 474, a pair of laterally spaced apart mixing fins 476, a bifurcated mixing fin 478 and outboard mixing fins 480, 482. The fins of this mixing element 406 extend substantially parallel to the like fins of second mixing element 404. It should be appreciated that this relationship is merely exemplary and other angles may be defined.

Fourth mixing element 408 is substantially similar to second mixing element 404 and third mixing element 406. Fourth mixing element 408 includes first and second flanges 486, 488. A base 490 interconnects first flange 486 with second flange 488. Base 490 is positioned to extend substantially parallel to the direction of flow S and base 470. First flange 486 and second flange 488 are shaped and positioned to be fixed to inner surfaces 440, 444 of first mixing element 402. In similar fashion to second mixing element 404, fourth mixing element 408 includes a correction fin 494, a pair of laterally spaced apart mixing fins 496, a bifurcated mixing fin 498 and outboard mixing fins 500, 502.

Fifth mixing element 610 includes ninth and tenth flanges 684, 686, positioned within slots 688, 690 and fixed to seventh and eighth lips 692, 694.

Once each of second mixing element 404, third mixing element 406 and fourth mixing element 408 have been fixed to first mixing element 402, the mixer assembly 400 may be positioned within an exhaust conduit such as exhaust gas pipe 40 previously described. It should be appreciated that first side wall 412 and second side wall 414 are sized and shaped to contact or be in close proximity to an inner surface of exhaust gas pipe 40. Mixer 400 is placed within exhaust gas pipe 40 at a desired axial position and angular orientation and then fixed thereto by any number of processes including welding, mechanical fastening, clamping or the like.

Figure 21:
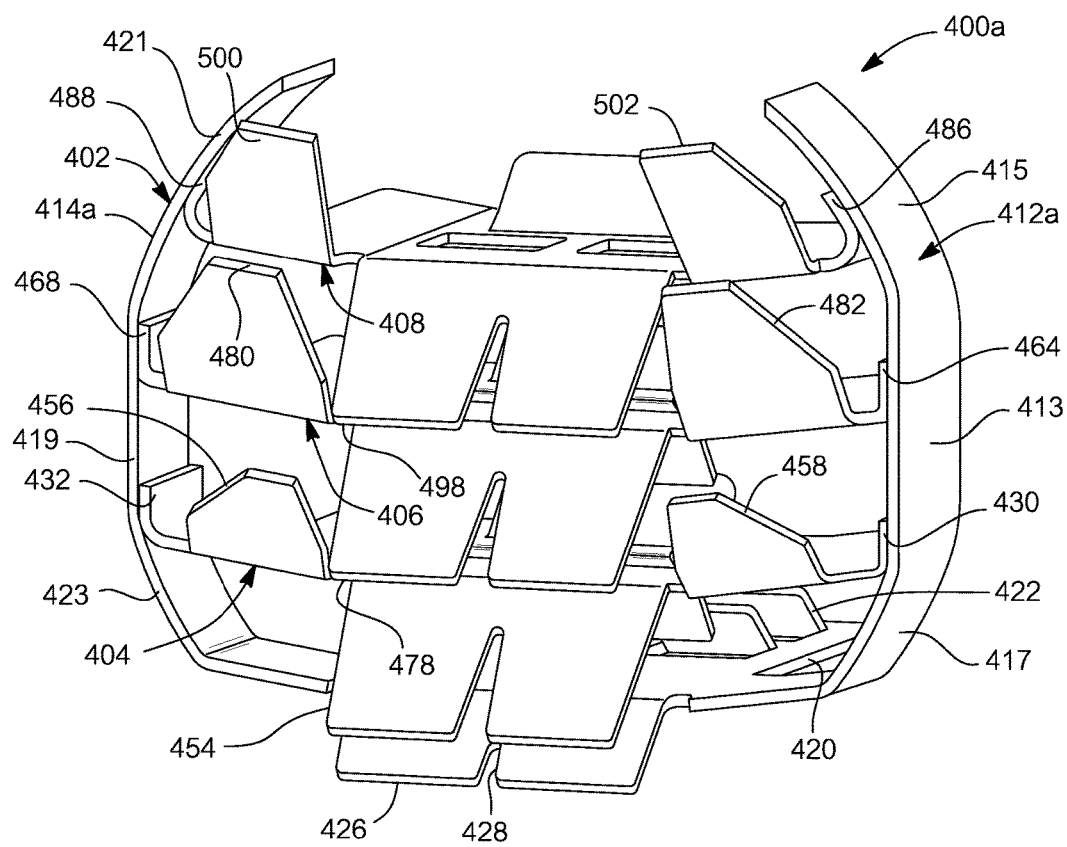
FIG. 21 is a perspective view of another alternate mixer.

FIG. 21 depicts an alternate mixer identified at reference numeral 400a. Mixer 400a is substantially similar to mixer 400 previously described with the exception that a first side wall 412a includes a substantially planar portion 413 positioned between arcuately shaped portions 415 and 417. Substantially planar portion 413 is spaced apart from an inner surface of exhaust gas pipe 40 while portions 415 and 417 conform to the inner surface and are fixed thereto by a process such as welding. In similar fashion, a second side wall 414a includes a substantially planar center portion 419 positioned between a curved portion 421 and another curved portion 423. Substantially planar center portion 419 is spaced apart from an inner surface of exhaust gas pipe 40.

Figure 22:
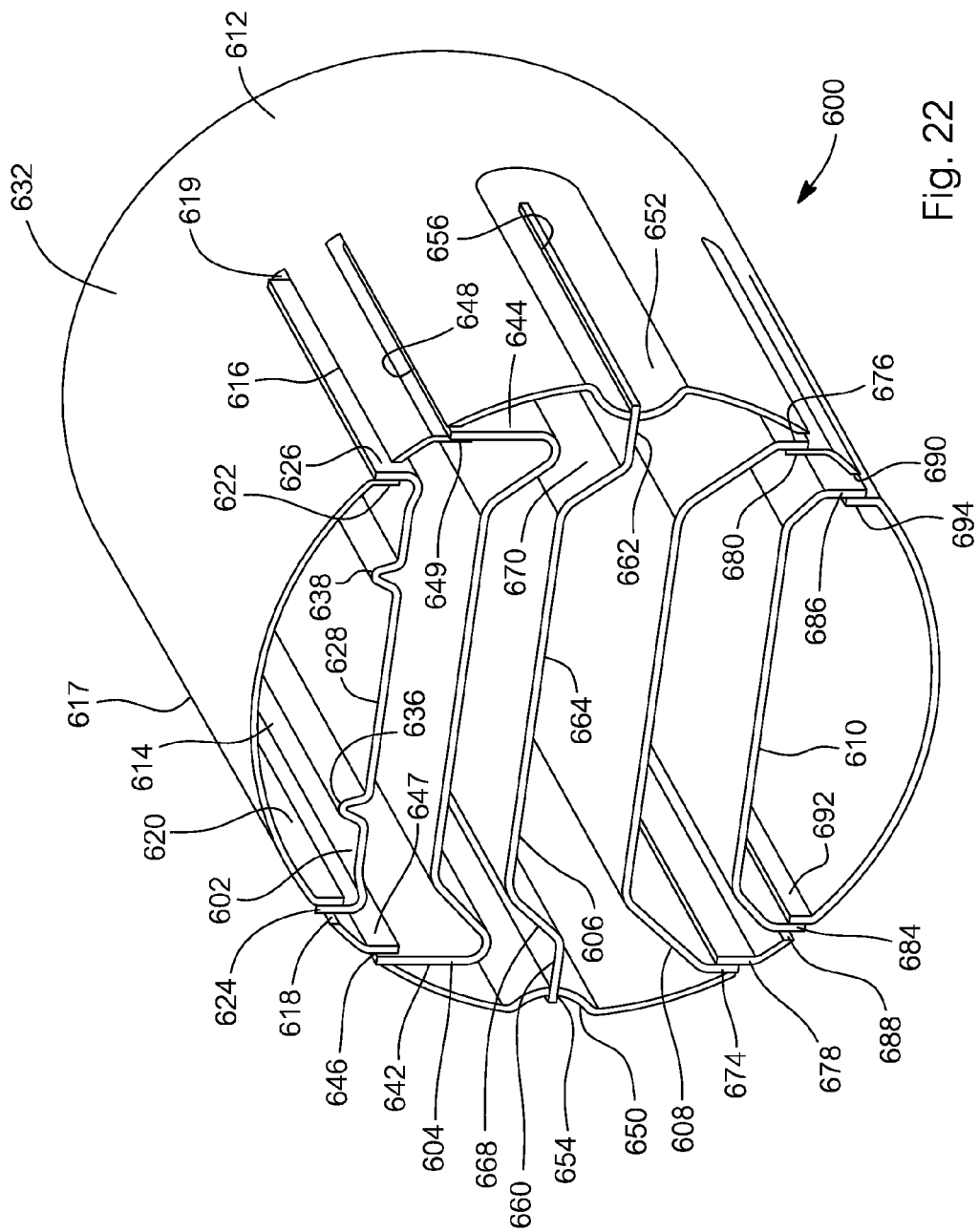
FIG. 22 is a perspective view of another alternate mixer.
Figure 23:
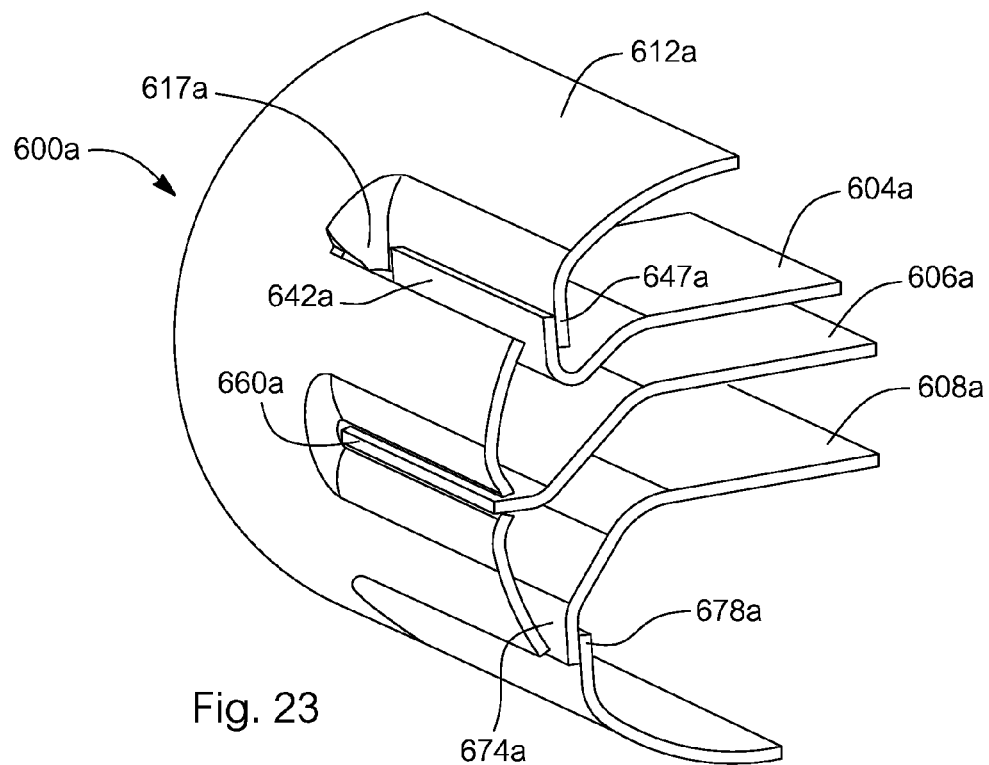
FIG. 23 is a fragmentary perspective view of another alternate mixer.
Figure 24:
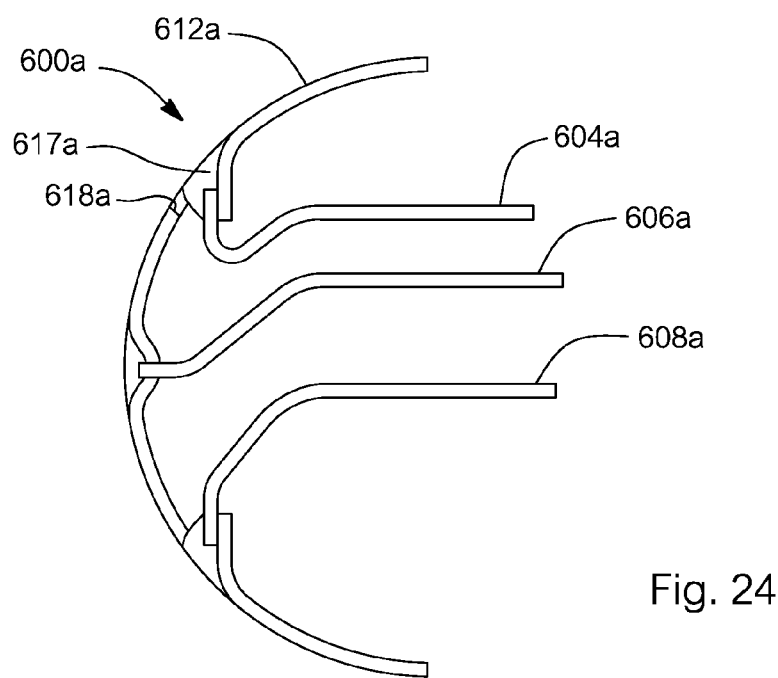
FIG. 24 is a fragmentary end view of the mixer depicted in FIG. 23.

FIGS. 22 through 24 depict another alternate mixer identified at reference numeral 600. Mixer 600 includes a plurality of transversely spaced apart mixing elements 602, 604, 606, 608 and 610. Mixer 600 includes a housing 612 in receipt of each of the mixing elements 602 through 610. Housing 612 may be a separate element and positioned inside an exhaust gas pipe or, in the alternative, element 612 may represent the exhaust gas pipe itself.

Housing 612 includes an open end 614 from which several pairs of slots axially extend. A first pair of slots 616, 618 axially extend parallel to one another from open end 614 for a predetermined distance terminating at stop faces 617, 619. Slots 616, 618 may be formed as part of a stamping operation where cuts are made to extend through housing 612 and a tool forms inwardly protruding lips, such as a first lip 620 and a second lip 622. First lip 620 extends substantially parallel to second lip 622.

First mixing element 602 includes a first peripheral portion or flange 624 and a spaced apart and substantially parallel second peripheral portion or flange 626. A base 628 interconnects first and second flanges 624, 626. First flange 624 extends into slot 618 adjacent to first lip 620. In similar fashion, second flange 626 extends into slot 616 and is positioned adjacent to second lip 622. First and second flanges 624, 626 are fixed to first and second lips 620, 622 via welding or brazing. The terminal ends of flanges 624, 626 are recessed below a cylindrical surface 632 defined by the majority of housing 612. In this manner, mixer 600 may be easily inserted within an exhaust conduit having a circular cross section. Base 628 is depicted as being substantially planar and including a pair of axially extending ribs 636, 638. Ribs 636, 638 provide inflection points about which first mixing element 602 may bend to accommodate an increase in element size based on the coefficient of thermal expansion. It should be appreciated that any number of geometrical features may be included to achieve desired flow and mixing characteristics. For example, it is contemplated that any one of mixing elements 602, 604, 606, 608, 610 may include one or more bends or protruding tabs similar to correction fin 450 and/or mixing fins 476, 478 or 480.

Second mixing element 604 is substantially similar to first mixing element 602 having axially extending third and fourth flanges 642, 644. A second pair of slots 646, 648 extend through housing 612 and are in receipt of third and fourth flanges 642, 644, respectively. Second mixing element 604 is fixed to third and fourth lips 647, 649 of housing 612.

A pair of opposing indentations 650, 652 are formed in housing 612. Slots 654, 656 extend through housing 612 within indentations 650, 652. Inwardly extending lips, such as lips 620, 622, are not formed from housing 612 adjacent slots 654, 656. On the contrary, slot 654 is positioned between end faces 657, 659 of housing 612 that are spaced apart from and facing one another. Third mixing element 606 includes substantially radially extending fifth and sixth flanges 660 and 662 extending into slots 654, 656.

Third mixing element 606 includes a base portion 664 offset from radially extending peripheral portions or flanges 660, 662. Base portion 664 is interconnected to radially extending flanges 660, 662 by angled walls 668, 670 to assure that mixer 600 may withstand repeated heating and cooling events and not be structurally compromised due to the coefficient of thermal expansion of the mixing elements. Each mixing element includes a bend or some geometrical shape positioned radially outward of the central planar base portion to provide a bending inflection point. During heating, as the central substantially planar base portions increase in width, bending of each mixing element will occur, if necessary, to relieve stress and minimize the force exerted on housing 612. It is also contemplated that one or more of the mixing elements may include a center base portion and peripheral portions that are coplanar. The housing will include a spring element to account for thermal expansion such as a portion of indentation 650. Inflection points are not provided on the mixing elements in this configuration.

Returning to the embodiment of FIGS. 22-24, it should be noted that the peripheral portions or flanges 660, 662 are not upturned but extend substantially parallel to base portion 664. As such, one surface of flange 660 is positioned adjacent to end face 657 while the opposite surface of flange 660 is positioned adjacent to end face 659. A similar arrangement exists with flange 662 and the end faces bounding slot 656.

Fourth mixing element 608 is substantially similar to second mixing element 604 with the exception that its spaced apart seventh and eighth flanges 674, 676 outwardly extend in an opposite direction as third and fourth flanges 642, 644. To accommodate this arrangement, fifth and sixth lips 678, 680 inwardly extend toward third and fourth lips 647, 649.

Each of the mixing elements may be constructed using a stamping or forming operation to a metal sheet. The size and shape of the mixing elements may be standardized or individually tailored to a particular application. In addition, it should be appreciated that while the Figures depict a mixer having five mixing elements, other mixers are contemplated having fewer or more mixing elements than those shown. For example, FIGS. 23 and 24 depict a mixer 600a. Mixer 600a is substantially to mixer 600. As such, like elements will be identified with similar reference numerals having a lower "a" suffix. Mixer 600a includes a first mixing element 604a, a second mixing element 606a and a third mixing element 608a. Housing 612a includes only the requisite number of slots to receive these mixing elements.

Figure 25:
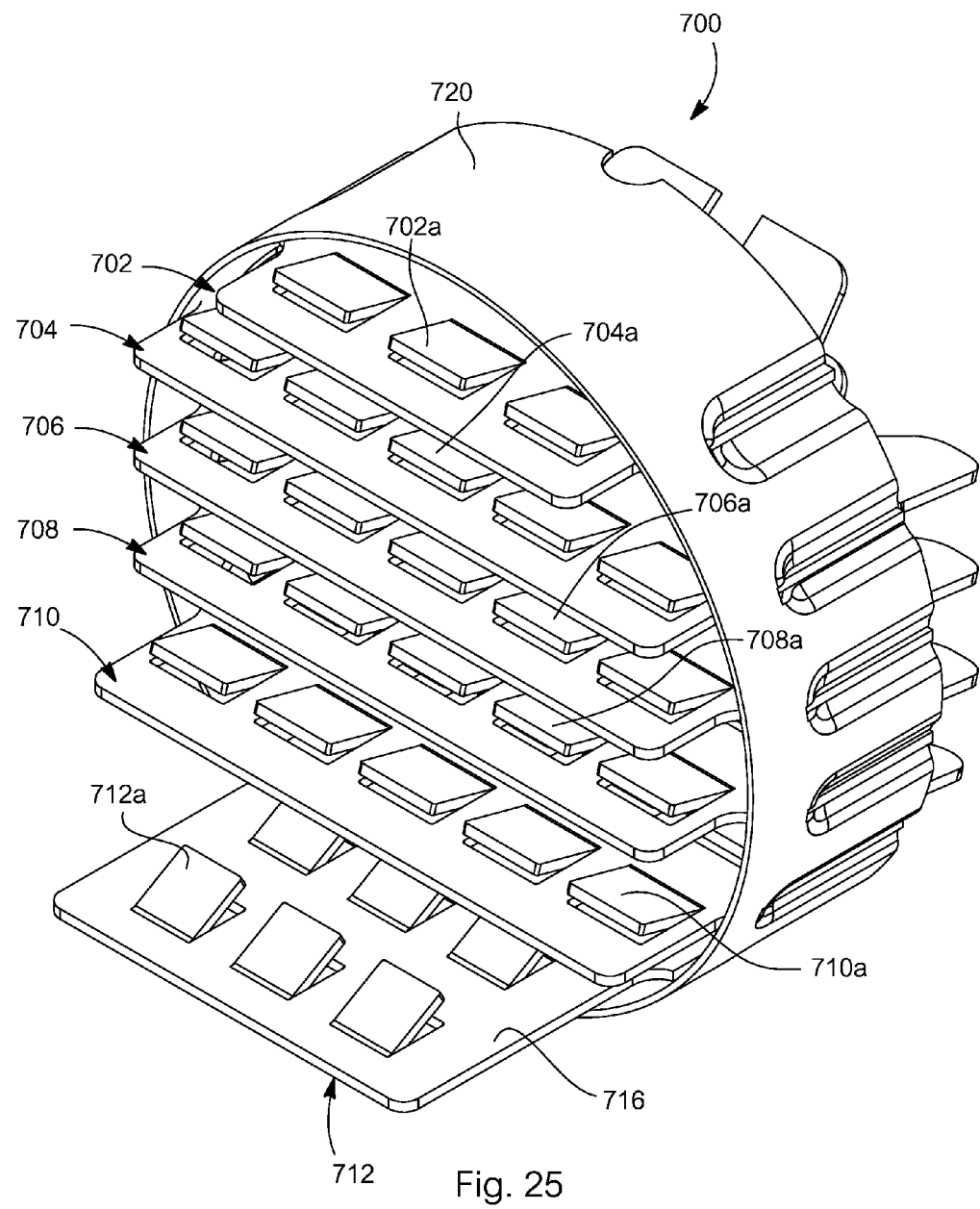
FIG. 25 is a perspective view of another alternate mixer.
Figure 26:
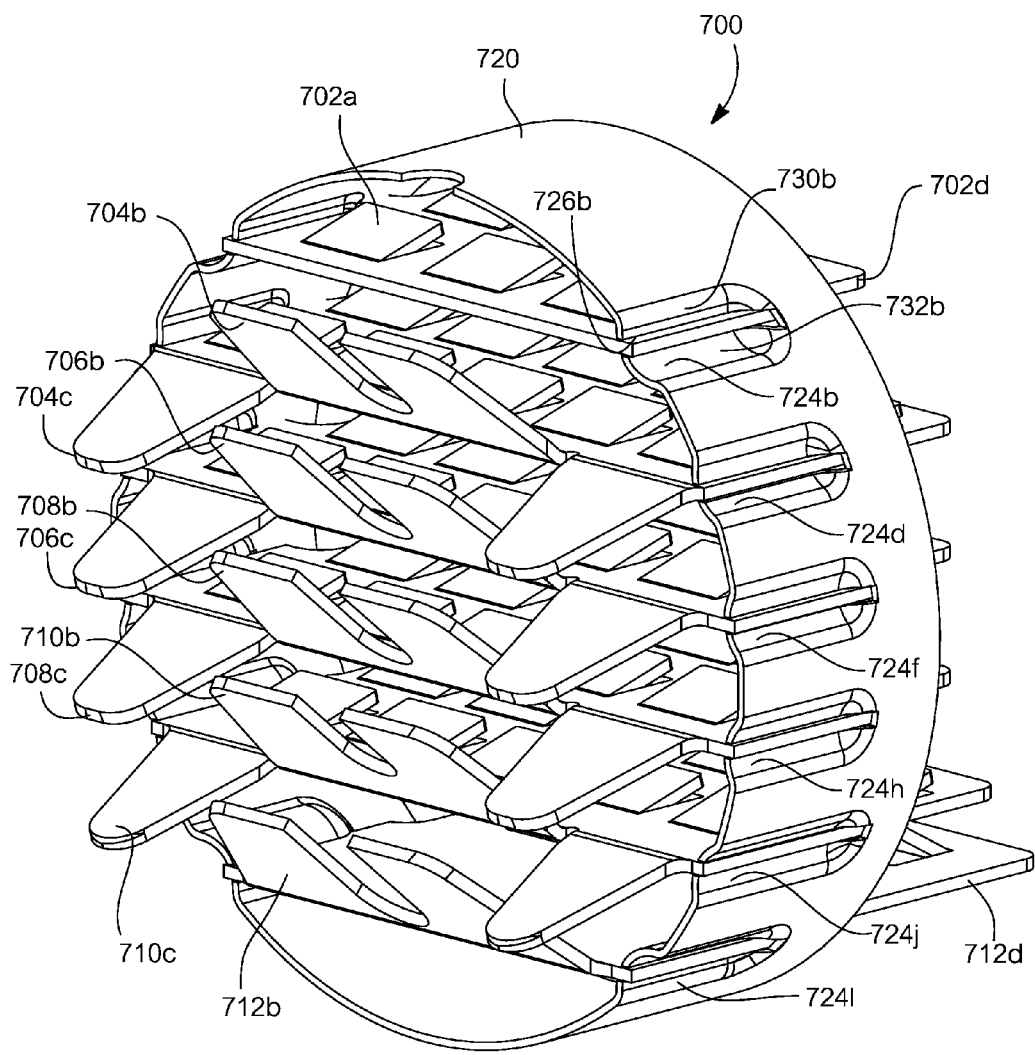
FIG. 26 is a perspective view of the mixer depicted in FIG. 25 taken at another angle.
Figure 27:
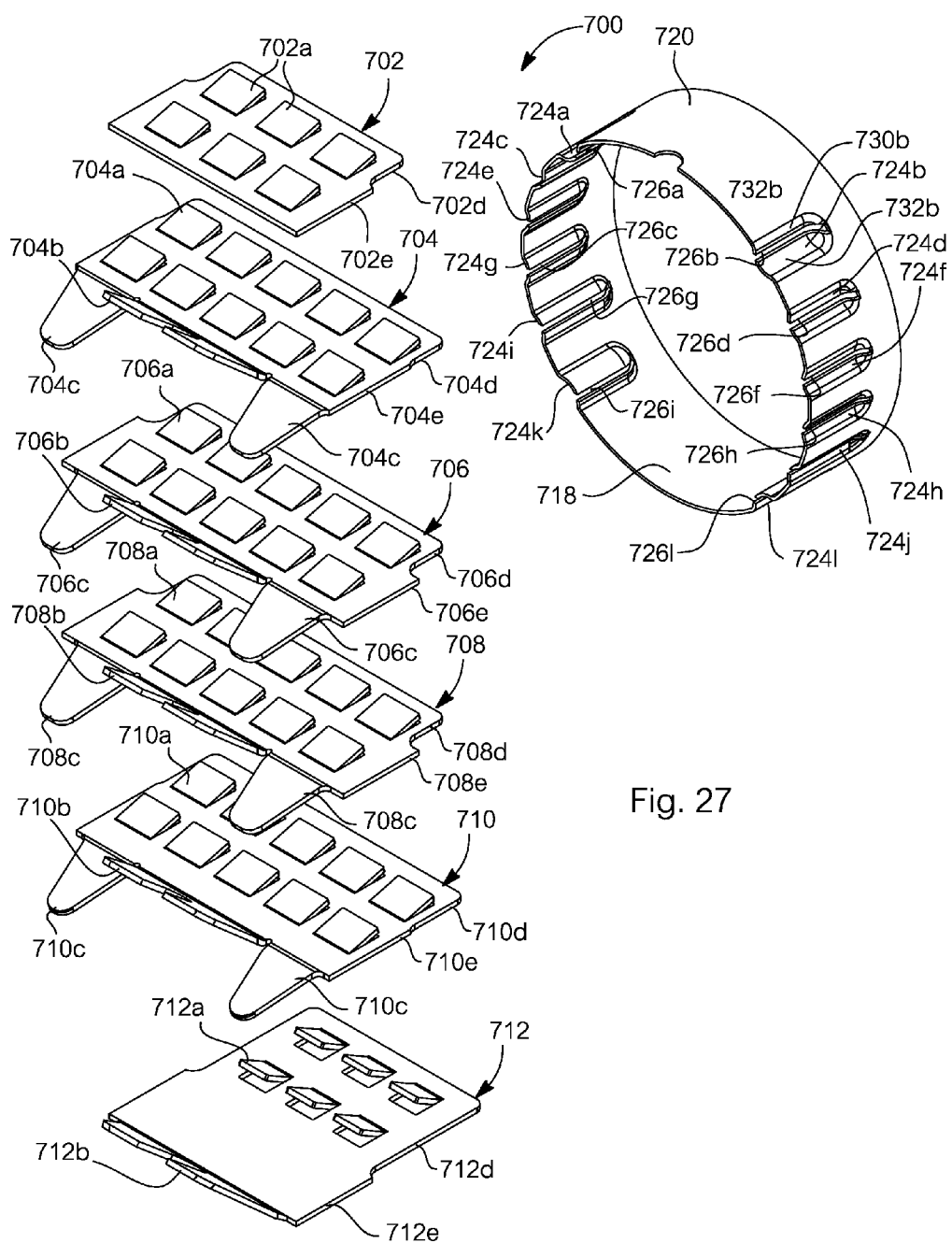
FIG. 27 is an exploded perspective view of the mixer depicted in FIGS. 25 and 26.

FIGS. 25-27 depict an alternate mixer 700 including first through sixth mixing elements 702, 704, 706, 708, 710 and 712, respectively. The mixing elements of mixer 700 are substantially similar to the mixing elements of mixer 400 and mixing element 606 of mixer 600 with the exception that a body portion of each of the mixing elements is shaped as a substantially planar flat plate having fins extending at an angle relative thereto. Each of the mixing elements 702-710 includes upturned mixing fins identified with an "a" suffix. Mixing element 712 includes an outwardly extending deflection element 716 having correction fins 712a that face the opposite direction as mixing fins 702a-710a. Mixing elements 704 through 712 also include a plurality of trailing mixing fins located in a central portion of each mixing element and identified with a "b" suffix. Elements 704 through 710 also include trailing laterally spaced apart outboard mixing fins identified with a lower "c" suffix. It should be appreciated that the quantity of each type of mixing fin and the angle at which they extend from the substantially planar base portion may be specifically tailored to best distribute injected reagent within a particular exhaust treatment system.

Each mixing element includes a tongue portion having a reduced width identified with the mixing element reference numeral including a "d" suffix extending coplanar with a body portion having a full width and identified with an "e" suffix. The width of the tongue is reduced to clear an inner substantially cylindrically shaped surface 718 of a ring 720.

Ring 720 includes a plurality of radially inwardly extending indentations 724. Each indentation includes a slot 726 extending therethrough. The indentations and the slots are provided in pairs and identified with suffix letters "a" through "l". The slots are also identified with the corresponding suffix letter according to the paired position. The reduced width tongue portions having suffix "d" are first inserted into ring 720. The peripheral portions of the wider body portion having an "e" suffix extend through a corresponding pair of slots. For example, the peripheral portions of body portion 702e laterally extend into slots 726a and 726b. As previously described regarding third mixing element 606, the axial position of each of the mixing elements 702 through 712 is defined by the length of the corresponding slots and an axial location of the transition between the tongue portions having the "d" suffix and the body portions identified with the "e" suffix.

Positioned on one side of each slot 726 is a spring element 730 and another spring element 732 on the opposite side of slot 726. For clarity, only spring elements 730b and 732b are identified in FIGS. 26 and 27. Spring elements 730, 732 radially outwardly deflect during a thermal event where the temperature of mixing element 702 increases and its width correspondingly increases due to the linear coefficient of thermal expansion. The remaining spring elements function similarly when their associated mixing element changes dimension as the temperature changes.

Figure 28:
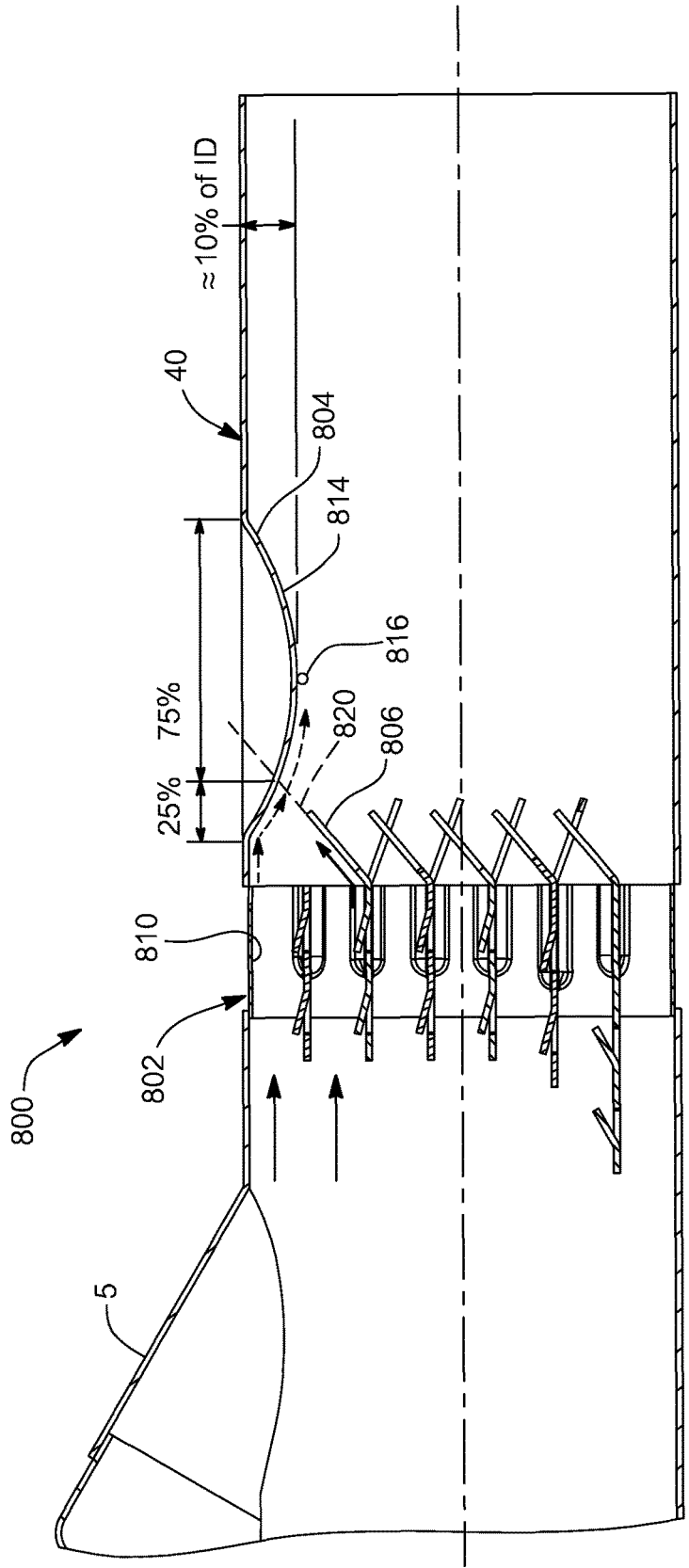
FIG. 28 is a fragmentary cross-sectional view of a portion of an exhaust treatment system including another alternate mixer.

An alternate mixer 800 is depicted at FIG. 28. Mixer 800 includes a mixer 802 substantially similar to one of the mixers previously described, including mixer 1, mixer 400, mixer 600 or mixer 700. Mixer 800 combines mixer 802 with a secondary mixer 804 to improve reagent distribution in exhaust pipe 40.

Figure 18:
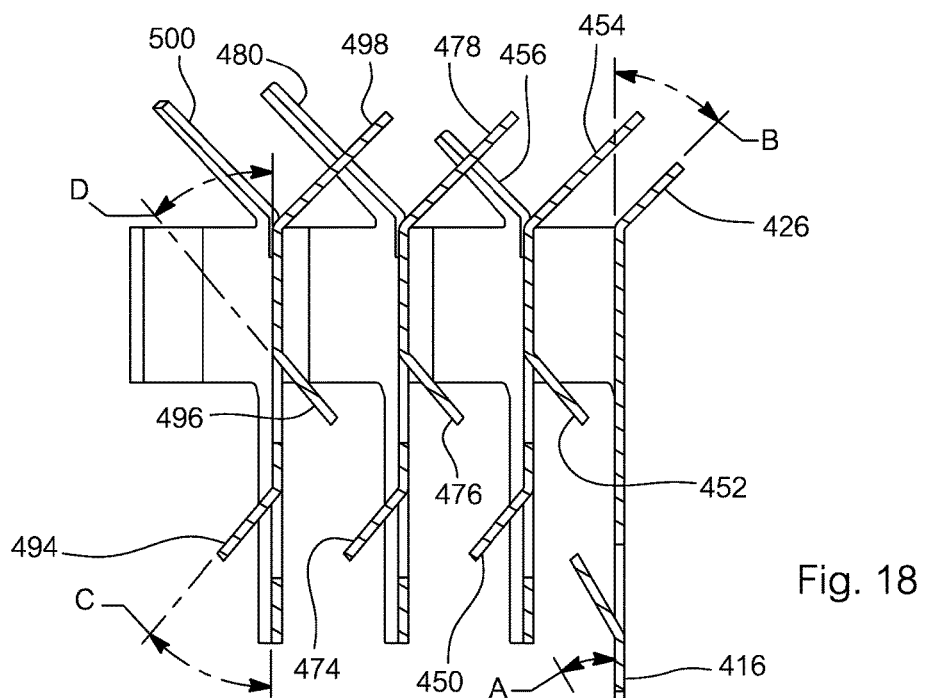
FIG. 18 is a cross-sectional view of the mixer taken through line 18-18 as shown in FIG. 17.
Figure 19:
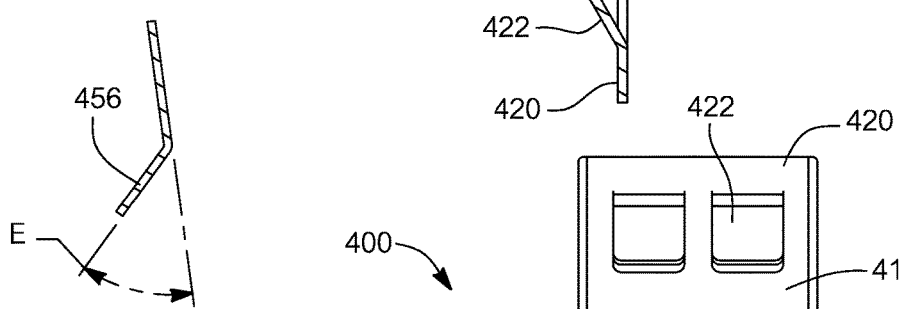
FIG. 19 is a fragmentary cross-sectional view taken through line 19-19 as shown in FIG. 18.
Figure 20:
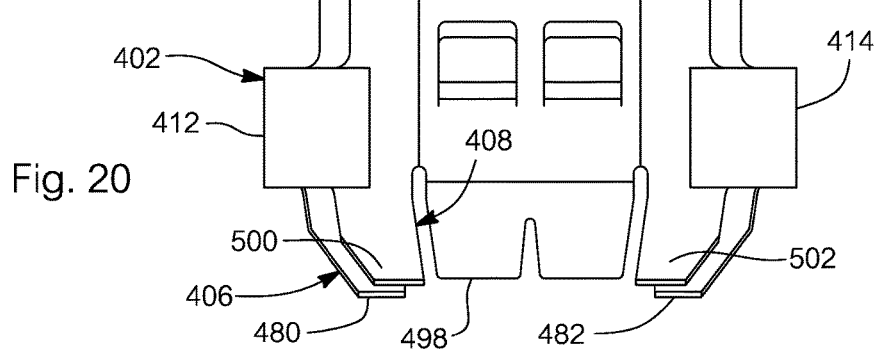
FIG. 20 is a side view of the mixer.

Mixer 802 includes an uppermost rearward mixing fin 806 substantially similar to mixing fin 500 depicted in FIG. 18 or mixing fin 31 as shown in FIG. 39a. Mixer 800 combines the mixing features of mixer 802 with secondary mixer 804 to address a concern of injected reagent flowing on or near an upper surface 810 of exhaust pipe 40. Upper surface 810 is defined as the portion of the inner surface of exhaust pipe 40 that extends downstream at the approximate angular location of injection device 5. Secondary mixer 804 provides a flow modification of the exhaust stream to improve the reagent distribution downstream.

Secondary mixer 804 is depicted as a substantially spherically-shaped protrusion 814 radially inwardly protruding from upper surface 810. Protrusion 814 includes a point 816 of maximum radial inward position being indented approximately 10 percent of the diameter of the exhaust pipe 40. Secondary mixer 804 is positioned to interact with the output from mixer 802. In particular, a construction line 820 is drawn extending from mixing fin 806 extending downstream. Construction line 820 intersects secondary mixer 804 at a position where protrusion 814 continues to radially inwardly extend. Stated another way, construction line 820 intersects protrusion 814 at a location upstream of point 816. In the particular example depicted in the Figure construction line 820 intersects protrusion 814 at a point where 25 percent of the protrusion 814 lies upstream of the intersection while 75 percent of the protrusion 814 remains positioned downstream of the intersection between construction line 820 and protrusion 814.

Advantageously, secondary mixer 804, with its minimal inward protrusion, provides little to no back pressure contribution. The exhaust velocity distribution remains substantially the same while the reagent uniformity indicates a 7-12 percent improvement of an arrangement simply using mixer 802. Computational fluid dynamics modeling indicates reagent concentration as well as the gradient of species distribution is diffused through the use of mixer 802 in combination with secondary mixer 804. It is contemplated that protrusion 814 may be axially positioned such that construction line 820 intersects secondary mixer 804 at a location ranging from 10 percent to 50 percent of the protrusion's axial length. In this manner, exhaust and reagent travelling along upper surface 810 will be deflected radially inwardly while exhaust and reagent travelling across mixing fin 806 is being directed in a radially outward direction.

Another alternate mixer 900 is depicted at FIGS. 29 and 30. Mixer 900 is somewhat similar to mixer 700 where each of mixing elements 902, 904, 906, 908 are shaped as substantially planar flat plates. The mixing elements may optionally include mixing fins that are not shown in FIGS. 29 and 30 but depicted in FIGS. 26 and 27 as mixing fins identified with an "a" suffix. At least one of the mixing elements of mixer 900 may also include an outwardly extending deflection element similar to deflection element 716, having correction fins 712a. Trailing mixing fins may also be positioned on one or more of the mixing elements of mixer 900 that are substantially similar to those identified with "b" suffixes in FIGS. 25-27. One or more of the mixing elements of mixer 900 may also include outboard spaced apart mixing fins similar to those identified by a lower "c" suffix in relation to mixer 700.

Mixer 900 includes a ring 912 including a leading edge 914 and a trailing edge 916. A leading collar portion 918 is shaped as a substantially circular cylinder that axially extends from leading edge 914 to a transition line 920. A trailing collar portion 924 is also shaped as a substantially circular cylinder. Trailing collar portion 924 extends from trailing edge 916 to a transition line 926. The outer diameter of leading collar portion 918 is equal to the diameter of trailing collar portion 924. A reduced diameter center portion 930 is axially positioned between leading collar portion 918 and trailing collar portion 924. A conical or otherwise first flared portion 934 interconnects center portion 930 with leading collar portion 918. In similar fashion, a second flared or conical portion 938 interconnects center portion 930 with trailing collar portion 924. It is contemplated that ring 912 is a continuous unbroken ring constructed from a metal material having a substantially constant wall thickness.

Ring 912 includes pairs of apertures 948a, 948b; 950a, 950b; 952a, 952b; and 954a, 954b. Each aperture is substantially similar to another and only one will be described in detail. Aperture 948a includes an axially extending portion 960, a first circumferentially extending portion 962 and a second circumferentially extending portion 964. Axially extending portion 960 terminates at a first edge 968 located in center portion 930. Edge 968 does not extend into first flared portion 934 or leading collar portion 918. As such, edge 968 extends from an inner cylindrical surface 970 of center portion 930 to an outer cylindrical surface 972 of center portion 930. Axially extending portion 960 terminates at an opposite edge 978. Portion 960 extends up to trailing collar portion 924. Axially extending portion 960 extends through second flared portion 938. Circumferentially extending portions 962 and 964 at least partially define a compliant tab 982.

Mixing element 902 is fixed to a distal end 986 of tab 982 using a process such as welding. The weld is not depicted in the Figures. Mixing element 902 is spaced apart from the remainder of ring 912 except at its opposite end where mixing element 902 is fixed to a distal end of another tab associated with aperture 948b. Tab 982 and its counterpart associated with aperture 948b function as springs that deflect to account for the coefficient of thermal expansion of mixing element 902. Changes in the operating temperature of mixer 900 are addressed by allowing the tabs to bend as the width of the mixing elements vary. By connecting mixing element 902 to ring 912 only at tab 982 and its counterpart, manufacturing is simplified through the use of a simple weld being applied on outer surface 972 of center portion 930, where tab 982 contacts mixing element 902. The welds remain positioned radially inward from the outer diameter defined by leading collar portion 918 and trailing collar portion 924.

An overall width of mixing element 902 is defined to protrude through apertures 948a and 948b beyond surface 972 of center portion 930. The width of mixing element 902 is also set to a dimension assuring that the mixing element does not protrude beyond the outer cylindrical surfaces of leading collar portion 918 and trailing collar portion 924. Preferably, the width of the mixing element 902 approximates a chord extending across an inner cylindrical surface 988 of trailing collar portion 924. The relative size relationship between features of mixing element 902 and ring 912 allows mixing element 902 to be inserted by translating the mixing element along a longitudinal axis defined by axially extending portion of apertures 948a, 948b. A distance that mixing element 902 may be inserted within ring 912 is defined by the axial position of edge 968. A leading edge 990 of mixing element 902 is positioned adjacent to edge 968 at a minimal clearance such that reductant injected upstream from mixer 900 is at least partially blocked from contacting the weld interconnecting mixing element 902 and ring 912. The remaining apertures 950a, 950b, 952a, 952b, 954a, 954b are sized and shaped in a similar fashion to that described previously in relation to apertures 948a, 948b and mixing element 902.

FIG. 31 depicts an alternate ring 912a. Ring 912a is substantially similar to ring 912 except that the reduced size center portion 930a includes an oval or other non-circular cross-sectional shape. An inner surface 970a includes points T and B of minimal radial inward protrusion. A restriction to exhaust flow through ring 912a is minimized in relation to flow through ring 912 due to the increased cross-sectional flow area provided near points T and B.

The foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A mixer for mixing an exhaust flow in an exhaust pipe, the mixer comprising:
   a tubular housing including a first end, a second end and a center portion positioned between the ends, the center portion having a reduced size in relation to at least one of the first and second ends, the tubular housing including circumferentially spaced apart apertures extending through the center portion between the first and second ends; and
   a mixing element including a body having a first peripheral portion and a second peripheral portion opposite the first peripheral portion, the first peripheral portion being fixed to the center portion at a location adjacent to one of the apertures, the second peripheral portion being fixed to the center portion at a location adjacent to another one of the apertures.

2. The mixer of claim 1, wherein the center portion includes a tab positioned adjacent to one of the apertures, the tab being coupled to the mixing element such that the tab moves to account for a change in size of the mixing element as temperature changes.

3. The mixer of claim 2, wherein the apertures include an axially extending portion and spaced apart circumferentially extending portions, the mixing element extending through one of the axially extending portions.

4. The mixer of claim 3, wherein the mixing element protrudes radially outwardly beyond an outer surface of the center portion.

5. The mixer of claim 4, wherein one of the apertures is asymmetrical and the housing includes a face at the edge of the one aperture limiting a distance of axial insertion of the mixing element within the housing.

6. The mixer of claim 1, wherein the center portion is shaped as a circular cylinder.

7. The mixer of claim 1, wherein the center portion is shaped as a non-circular cylinder.

8. The mixer of claim 2, wherein the tubular housing and the tab are monolithically constructed as one piece.

9. The mixer of claim 1, wherein the housing includes a leading collar portion and a trailing collar portion positioned on opposite sides of the center portion, at least one of the leading and trailing collar portions including an outer cylindrical surface having a first size, the center portion including an outer cylindrical surface having a second size less than the first size.

10. The mixer of claim 1, wherein the mixing element extends parallel to a second mixing element fixed to the center portion.

11. The mixer of claim 1, wherein the mixing element includes a mixing fin extending at an angle to the body to change a direction of the exhaust flow.

12. The mixer of claim 11, wherein the mixing element includes a deflection element positioned upstream of the mixing fin.

13. The mixer of claim 12, wherein the deflection element includes a substantially planar portion extending substantially parallel to a direction of the exhaust flow and a correction fin extending at an angle to the exhaust flow direction.

14. The mixer of claim 13, wherein the deflection element extends at an angle of substantially 30 degrees to a direction of exhaust flow upstream of the mixer.

15. The mixer of claim 14, wherein the mixing fin extends at an angle ranging substantially from 40 degrees to 45 degrees relative to a direction of exhaust flow upstream of the mixer.

16. A mixer for mixing an exhaust flow in an exhaust pipe, the mixer comprising:
   a tubular housing including first and second ends and a center portion therebetween, the center portion having a reduced outer size and a reduced inner size as compared to one of the first and second ends, the center portion including spaced apart apertures; and
   a mixing element positioned within the housing and being fixed to the center portion of the housing at locations adjacent at least two of the apertures.

17. The mixer of claim 16, wherein the housing includes a flared portion interconnecting one of the first end and the second end with the center portion.

18. The mixer of claim 16, wherein the apertures each include an axially extending portion and spaced apart circumferentially extending portions, the mixing element extending through one of the axially extending portions.

19. The mixer of claim 18, wherein the axially extending portion of the apertures includes a first end terminating within the center portion.

20. The mixer of claim 19, wherein the first end of the axially extending portion terminates at a stop face limiting an amount of axial insertion of the mixing element within the housing.

21. The mixer of claim 18, wherein the circumferentially extending portions of one of the apertures are positioned on either side of a tab that is fixed to the mixing element.

22. The mixer of claim 21, wherein the mixing element is free to move relative to the housing except at the tab and another tab.

23. The mixer of claim 16, wherein a cross-sectional shape of the tubular housing is non-circular.

24. The mixer of claim 16, further including a weld positioned on an outer surface of the center portion fixing the mixing element to the tubular housing.

* * * * *

UNITED STATES PATENT AND TRADEMARK OFFICE
CERTIFICATE OF CORRECTION

PATENT NO. : 9,975,093 B2
APPLICATION NO. : 14/799081
DATED : May 22, 2018
INVENTOR(S) : Manoj K. Sampath et al.

Page 1 of 1

It is certified that error appears in the above-identified patent and that said Letters Patent is hereby corrected as shown below:

On the Title Page

Item (73): Delete "Operation" and insert --Operating--

Item (30): Delete "10 2008 020 008" and insert --102008020008.5--

Signed and Sealed this
Eleventh Day of December, 2018

Andrei Iancu
*Director of the United States Patent and Trademark Office*